United States Patent
Kume et al.

(10) Patent No.: US 6,330,049 B1
(45) Date of Patent: *Dec. 11, 2001

(54) LIQUID CRYSTAL DISPLAY DEVICE, AND METHOD FOR PRODUCING THE SAME

(75) Inventors: Yasuhiro Kume, Nara; Masahiko Kondo, Kitakatsuragi-gun; Masatoshi Yoshimi, Tenri; Katsuyuki Himeshima, Nara; Nobuaki Yamada, Higashiosaka; Kazuyuki Kishimoto, Tenri, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,752

(22) Filed: Mar. 17, 1999

(30) Foreign Application Priority Data

Mar. 25, 1998 (JP) .................................................. 10-076786

(51) Int. Cl.⁷ ........................ G02F 1/1339; G02F 1/1537
(52) U.S. Cl. ........................... 349/156; 399/155; 399/130
(58) Field of Search ............................. 349/99, 156, 178, 349/155, 167, 130

(56) References Cited

U.S. PATENT DOCUMENTS

| 5,619,356 | * | 4/1997 | Kozo et al. ............................... 349/99 |
| 5,978,061 | * | 11/1999 | Miyazaki et al. ..................... 349/156 |
| 5,995,190 | * | 11/1999 | Nagae et al. ........................... 349/156 |
| 5,997,379 | * | 12/1999 | Kimura ................................... 445/25 |

FOREIGN PATENT DOCUMENTS

| 06-273735 | * | 9/1994 | (JP) . |
| 6-273735 A | | 9/1994 | (JP) . |
| 10-186330 | * | 7/1998 | (JP) . |
| 10-186330 A | | 7/1998 | (JP) . |

* cited by examiner

*Primary Examiner*—Toan Ton
(74) *Attorney, Agent, or Firm*—Nixon & Vanderhye P.C.

(57) ABSTRACT

A liquid crystal display device of the present invention includes: a first substrate and a second substrate; a liquid crystal layer interposed between the first substrate and the second substrate, and a vertical alignment layer provided on at least one of the first substrate and the second substrate on a side which is closer to the liquid crystal layer. The liquid crystal layer includes a plurality of liquid crystal regions partitioned by at least one partition wall provided on the first substrate on a side which is closer to the liquid crystal layer. The liquid crystal layer has a liquid crystal material with a negative dielectric anisotropy. Liquid crystal molecules in the plurality of liquid crystal regions are oriented in a direction substantially perpendicular to the first substrate and the second substrate in an absence of an applied voltage. The liquid crystal molecules in each of the liquid crystal regions are oriented in axial symmetry about an axis within the liquid crystal region which is substantially perpendicular to the first substrate and the second substrate in a presence of an applied voltage. The partition wall has a section which is inclined with respect to the surface of the first substrate.

19 Claims, 17 Drawing Sheets

PRIOR ART

PRIOR ART

Observed to be black

LIQUID CRYSTAL DISPLAY DEVICE, AND METHOD FOR PRODUCING THE SAME

BACKGROUND OF THE INVENTION

1. Field of the Invention

The present invention relates to a liquid crystal display device, and in particular to a liquid crystal display device having a wide viewing angle characteristic.

2. Description of the Related Art

Japanese Laid-Open Patent Publication No. 7-120728 discloses a display mode called "ASM mode" (Axially Symmetric Aligned Microcell Mode), where liquid crystal molecules are oriented in axial symmetry in each pixel, in order to improve the viewing angle characteristic of the display. In a display device of this mode, a plurality of liquid crystal regions are formed by phase separation from a mixture of a liquid crystal material with a positive dielectric anisotropy and a photocurable resin, so that the liquid crystal molecules in each liquid crystal region are oriented in axial symmetry.

Japanese Laid-open Patent Publication No. 8-341590 discloses a liquid crystal display device including: a pair of substrates; and a liquid crystal layer interposed between the pair of substrates, wherein: the liquid crystal molecules in the liquid crystal layer have a negative dielectric anisotropy; the liquid crystal layer includes a plurality of liquid crystal regions; the liquid crystal molecules are oriented in a direction substantially perpendicular to the pair of substrates in the absence of an applied voltage; and the liquid crystal molecules in each liquid crystal region are oriented in axial symmetry in the presence of an applied voltage. This liquid crystal display device operates in a normally black mode, and provides a higher contrast ratio than that of an ASM mode liquid crystal display device which operates in a conventional normally white mode. Moreover, the liquid crystal display device can be produced relatively easily.

FIGS. 1A and 1B illustrate a liquid crystal display device of Japanese Laid-Open Patent Publication No. 8-341590, wherein FIG. 1A is a cross-sectional view and FIG. 1B is a plan view thereof. In the liquid crystal display device, a pair of substrates (e.g., a glass substrates 4 and 8) are provided to oppose each other with a predetermined gap therebetween. A liquid crystal layer 6 of liquid crystal molecules with a negative dielectric anisotropy is interposed between the glass substrates 4 and 8. A signal electrode 9 of a transparent conductive film (e.g., ITO) is formed in a stripe pattern on the inner surface (closer to the liquid crystal layer 6) of the glass substrate 4. A vertical alignment layer 22 of polyimide, or the like, is provided over the signal electrode 9 so as to cover substantially the entire surface of the glass substrate 4. A color filter (not shown) and a black matrix (not shown) are provided on the inner surface (closer to the liquid crystal layer 6) of the glass substrate 8. A signal electrode 10 of a transparent conductive film (e.g., ITO) is formed in a stripe pattern over the color filter and the black matrix. The striped signal electrode 10 is arranged to cross the striped signal electrode 9, thereby forming a pixel at each intersection therebetween. The color filter (not shown) includes RGB color layers for each pixel. The black matrix (not shown) has a pattern to cover the gap between adjacent color layers of the color filter (not shown). A plurality of partition walls 17 are provided on the glass substrate 8, with pillar-like spacers 20 being provided selectively and regularly on some of the partition walls 17, thereby defining a plurality of liquid crystal regions 15. A vertical alignment layer 21 of polyimide, or the like, is provided on the side surfaces of the pillar-like spacers 20 and on a portion of the glass substrate 8 on which the pillar-like spacer 20 is not provided. Thereafter, the pair of substrates are attached together with the predetermined gap therebetween into which a liquid crystal material is injected, thereby producing a display cell.

FIG. 2 is a schematic cross-sectional view showing a part of the liquid crystal display device of Japanese Laid-Open Patent Publication No. 8-341590. FIG. 2 illustrates the orientation of liquid crystal molecules 11 (11$a$, 11$b$ and 11$c$) in the liquid crystal layer 6 in the vicinity of the partition wall 17 along the periphery of the liquid crystal region 15 in the absence of an applied voltage. The partition wall 17 is provided on the signal electrode 10 which is provided on the glass substrate 8. The vertical alignment layer 21 covers the top and side surfaces of the partition wall 17 and the surface of the signal electrode 10.

In the absence of an applied voltage, the liquid crystal molecules 11$a$ along the side surface of the partition wall 17 are subject primarily to the anchoring force of the part of the vertical alignment layer 21 along the side surface of the partition wall 17, and thereby oriented in a direction substantially perpendicular to the side surface of the partition wall 17. The liquid crystal molecules 11$b$ along the signal electrode 10 are subject primarily to the anchoring force of the part of the vertical alignment layer 21 along the signal electrode 10, and thereby oriented in a direction substantially perpendicular to the substrate 8. The liquid crystal molecules 11$a$ at the corner of the side surface of the partition wall 17 and the substrate 8 are subject to both the anchoring force from the part of the vertical alignment layer 21 along the side surface of the partition wall 17 and the anchoring force from the part of the vertical alignment layer 21 along the signal electrode 10. Consequently, the liquid crystal molecules 11$c$ may suffer from disturbance in their orientation, which results in the liquid crystal molecules not being uniformly oriented in a single direction. Due to the disturbance in the orientation of the liquid crystal molecules, the liquid crystal molecules 11$c$ may produce birefringence, leading to light leakage. The light leakage may cause the contrast ratio of the display device to decrease in a black display, thereby deteriorating the display quality.

As will be discussed later in greater detail, the partition walls 17 define the position and the size of the respective liquid crystal regions 15 of the liquid crystal layer. Based on the anchoring force from the side surface of the partition wall 17, the liquid crystal molecules 11 in each liquid crystal region 15 are controlled to exhibit axially symmetric orientation in the presence of an applied voltage (white display). Conventionally, the partition wall 17 requires a sufficient height with respect to the thickness of the liquid crystal layer (or the cell gap) in order for the side surface of the partition wall 17 to provide the anchoring force and thereby to maintain a stable axially symmetric orientation of the liquid crystal molecules 11 in the liquid crystal region 15. With an insufficient height of the partition wall 17, the axially symmetric orientation of the liquid crystal molecules 11 may not be controlled sufficiently, thus failing to obtain the stable axially symmetric orientation. In such a case, the axially symmetric orientation may be destroyed, resulting in non-uniformity in a produced display.

The presence of the partition wall 17 in the liquid crystal layer 6 has presented the following problems. First, the partition wall 17 may present an obstruction to a liquid crystal injection process, thereby increasing the injection time and thus the production cost of the display device. Particularly, in a large-screen liquid crystal display device, there may occur a distribution in the composition ratio of the liquid crystal material across the liquid crystal panel, due to a phenomenon called "chromatographic phenomenon", thereby resulting in non-uniformity in a produced display.

When the display is viewed from an angle inclined from the direction normal to the display panel, some or all of incident light having passed through the liquid crystal region 15 may be blocked by the partition wall 17, thereby reducing the optical transmission and thus the brightness of the display device. This phenomenon becomes more pronounced as the partition wall 17 is taller and/or the view angle is inclined more from the direction normal to the display panel. When the display is viewed from an inclined angle, the incident light having passed through the liquid crystal region 15 may pass through the liquid crystal layer 6 just above the partition wall 17. In such a case, the optical transmission may be improved by effectively utilizing those liquid crystal molecules 11 which exist just above the partition wall 17 so that they contribute to a produced display. However, only a voltage effectively lower than a liquid crystal driving voltage is applied through those liquid crystal molecules 11 just above the partition wall 17, and thus such liquid crystal molecules 11 provide little or no contribution to a produced display in the presence of an applied voltage.

SUMMARY OF THE INVENTION

According to one aspect of this invention, a liquid crystal display device includes: a first substrate and a second substrate; a liquid crystal layer interposed between the first substrate and the second substrate; and a vertical alignment layer provided on at least one of the first substrate and the second substrate on a side which is closer to the liquid crystal layer. The liquid crystal layer includes a plurality of liquid crystal regions partitioned by at least one partition wall provided on the first substrate on a side which is closer to the liquid crystal layer. The liquid crystal layer has a liquid crystal material with a negative dielectric anisotropy. Liquid crystal molecules in the plurality of liquid crystal regions are oriented in a direction substantially perpendicular to the first substrate and the second substrate in an absence of an applied voltage. The liquid crystal molecules in each of the liquid crystal regions are oriented in axial symmetry about an axis within the liquid crystal region which is substantially perpendicular to the first substrate and the second substrate in a presence of an applied voltage. The partition wall has a section which is inclined with respect to the surface of the first substrate.

In one embodiment of the invention, the liquid crystal display device further includes a plasma substrate with at least one discharge channel provided on one of the first substrate and the second substrate on a side which is away from the liquid crystal layer, for applying a voltage across the liquid crystal layer via the one of the first substrate and the second substrate.

In another embodiment of the invention, the inclined section of the partition wall has an angle of about 3° to about 60° with respect to the surface of the first substrate.

In still another embodiment of the invention, a height (h) of the partition wall and a thickness (d) of the liquid crystal layer have a following relationship: h<d/4.

In still another embodiment of the invention, the partition wall is made of a photosensitive resin.

According to another aspect of this invention, there is provided a method for producing a liquid crystal display device. The liquid crystal display device includes: a first substrate and a second substrate; a liquid crystal layer interposed between the first substrate and the second substrate; and a vertical alignment layer provided on at least one of the first substrate and the second substrate on a side which is closer to the liquid crystal layer. The liquid crystal layer includes a plurality of liquid crystal regions partitioned by at least one partition wall provided on the first substrate on a side which is closer to the liquid crystal layer. The liquid crystal layer has a liquid crystal material with a negative dielectric anisotropy. Liquid crystal molecules in the plurality of liquid crystal regions are oriented in a direction substantially perpendicular to the first substrate and the second substrate in an absence of an applied voltage. The liquid crystal molecules in each of the liquid crystal regions are oriented in axial symmetry about an axis within the liquid crystal region which is substantially perpendicular to the first substrate and the second substrate in a presence of an applied voltage. The method includes the steps of: providing a photosensitive resin on the first substrate; and patterning the photosensitive resin using a photolithography method so as to form the partition wall having a section which is inclined with respect to the surface of the first substrate.

In one embodiment of the invention, the method further includes the step of: providing a plasma substrate with at least one discharge channel on one of the first substrate and the second substrate on a side which is away from the liquid crystal layer, for applying a voltage across the liquid crystal layer via the one of the first substrate and the second substrate.

In another embodiment of the invention, an angle of the inclined section of the partition wall with respect to the surface of the first substrate is controlled by at least one condition in the photolithography method.

In still another embodiment of the invention, the condition is one of an exposure intensity, an exposure time, a prebake temperature, a mask gap and a development time.

In still another embodiment of the invention, the condition includes, in combination, two or more of an exposure intensity, an exposure time, a prebake temperature, a mask gap and a development time.

In still another embodiment of the invention, the inclined section of the partition wall has an angle of about 3° to about 60° with respect to the surface of the first substrate.

In still another embodiment of the invention, a height (h) of the partition wall and a thickness (d) of the liquid crystal layer have a following relationship: h<d/4.

Functions of the present invention will now be described.

In the liquid crystal display device of the present invention, at least the first substrate includes partition walls on the side thereof closer to the liquid crystal layer. The partition walls divide the liquid crystal layer into a plurality of liquid crystal regions. Therefore, when a voltage is applied across the liquid crystal layer, the liquid crystal molecules in each of the liquid crystal regions are oriented in axial symmetry about an axis within the liquid crystal region which is substantially perpendicular to the surface of the substrate, thereby substantially eliminating the viewing angle dependency of the display device. The partition wall includes a section therein which is inclined from a direction normal to the surface of the first substrate. Therefore, disturbance in the orientation of liquid crystal molecules in the vicinity of the partition wall in the liquid crystal region is less likely to occur, thereby substantially eliminating light leakage in the vicinity of the partition wall in the liquid crystal region. Thus, it is possible to improve the contrast ratio of the display device in a black display, and thus the display quality of the display device.

According to the present invention, a plasma-addressed liquid crystal display device can be produced by further providing a plasma substrate with at least one discharge channel provided on a side of one of the two substrates, which side is away from the liquid crystal layer, for applying a voltage across the liquid crystal layer via the substrate. Also in such a case, it is possible to improve the contrast ratio, and thus the display quality, of the display device.

When the inclined section of the partition wall has an angle of about 3° to about 60° with respect to the surface of the first substrate, the axially symmetric orientation of the liquid crystal molecules can be stabilized. Thus, it is possible to provide a partition wall with a reduced height.

When the height (h) of the partition wall is so small with respect to the thickness (d) of the liquid crystal layer such that h<d/4, the following advantages are provided:

(1) Even when the display device is viewed from an inclined angle, incident light having passed through the liquid crystal region is not substantially blocked by the partition wall and reaches the observer.

(2) The effective driving voltage applied to the liquid crystal molecules just above the partition wall is increased, whereby those liquid crystal molecules can contribute more to a produced display. As a result, it is possible to increase the optical transmission and thus the brightness of the display.

(3) The area of the bottom surface of the partition wall can be substantially reduced, so that it is possible to reduce the amount of partition wall which extends into the pixel, thereby improving the aperture ratio.

(4) In a large-screen liquid crystal display device, it is possible to substantially eliminate the distribution in the composition ratio of the liquid crystal material across the liquid crystal panel due to the chromatographic phenomenon, thereby obtaining a uniform display characteristic.

(5) It is possible to increase the injection rate of a liquid crystal material into a liquid crystal cell, thereby reducing the production tact time (i.e., when injecting the liquid crystal material into the liquid crystal cell, the frictional resistance therebetween can be reduced, thereby increasing the injection rate).

When a photosensitive resin is used, it is easy to form a partition wall and to control the inclination angle thereof, the partition wall has a section therein which is inclined with respect to the surface of the first substrate by a patterning process using a photolithography method (including, for example, resist application, exposure, development, etching, resist removal processes).

According to the method for producing a liquid crystal display device of the present invention, a photosensitive resin is provided on the first substrate, which is then patterned by using a photolithography method, thereby forming a partition wall having a section therein which is inclined with respect to the first substrate. Thus, the liquid crystal display device can easily be produced using a simplified process.

The angle of the inclined section of the partition wall with respect to the surface of the first substrate may be easily controlled by adjusting at least one of, or a combination of two or more of, an exposure intensity, an exposure time, a prebake temperature, a mask gap and a development time.

Thus, the invention described herein makes possible the advantages of: (1) providing a liquid crystal display device having a high contrast ratio and a high aperture ratio without substantial viewing angle dependency; (2) providing a plasma-addressed liquid crystal display device having a high contrast ratio and a high aperture ratio without substantial viewing angle dependency: and (3) providing a method for producing such a liquid crystal display device or such a plasma-addressed liquid crystal display device.

The liquid crystal display device of the present invention operates in a normally black mode, and provides a higher contrast ratio than that of an ASM mode liquid crystal display device which operates in a conventional normally white mode. Moreover, the liquid crystal display device can be produced relatively easily.

These and other advantages of the present invention will become apparent to those skilled in the art upon reading and understanding the following detailed description with reference to the accompanying figures.

BRIEF DESCRIPTION OF THE DRAWINGS

FIGS. 1A and 1B are schematic diagrams illustrating a structure of a conventional liquid crystal display device, wherein FIG. 1A is a cross-sectional view thereof, and FIG. 1B is a plan view thereof;

FIGS. 3A to 3D illustrate an operation principle of a liquid crystal display device of the present invention, wherein FIG. 3A is a cross-sectional view illustrating the liquid crystal display device in the absence of an applied voltage, FIG. 3B illustrates polarization microscopy (in a crossed Nicols state) of the liquid crystal display device in the absence of an applied voltage, FIG. 3C is a cross-sectional view illustrating the liquid crystal display device in the presence of an applied voltage, and FIG. 3D illustrates polarization microscopy (in a crossed Nicols state) of the liquid crystal display device in the presence of an applied voltage;

DESCRIPTION OF THE PREFERRED EMBODIMENTS

Embodiments of the present invention will now be described.

Basic Operation

Figure 1A:
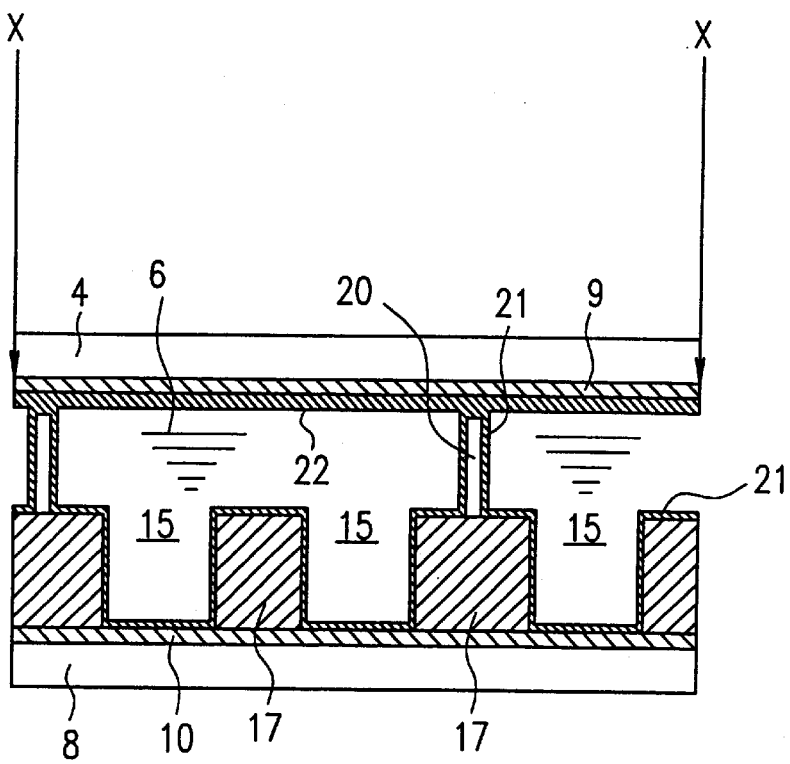
Figure 1B:
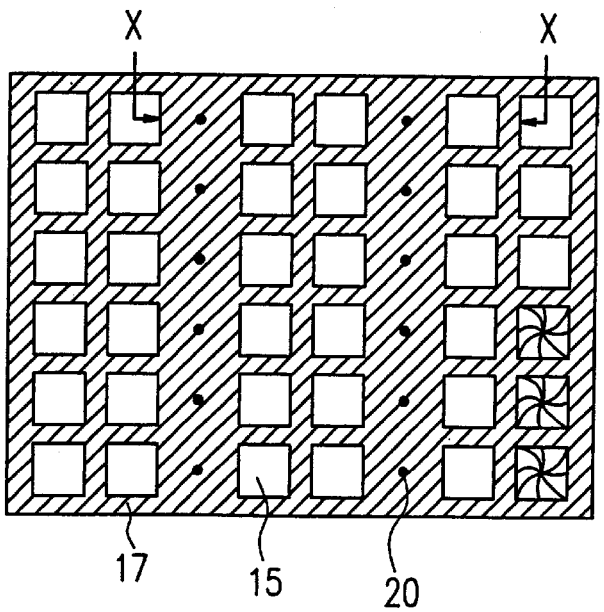
Figure 2:
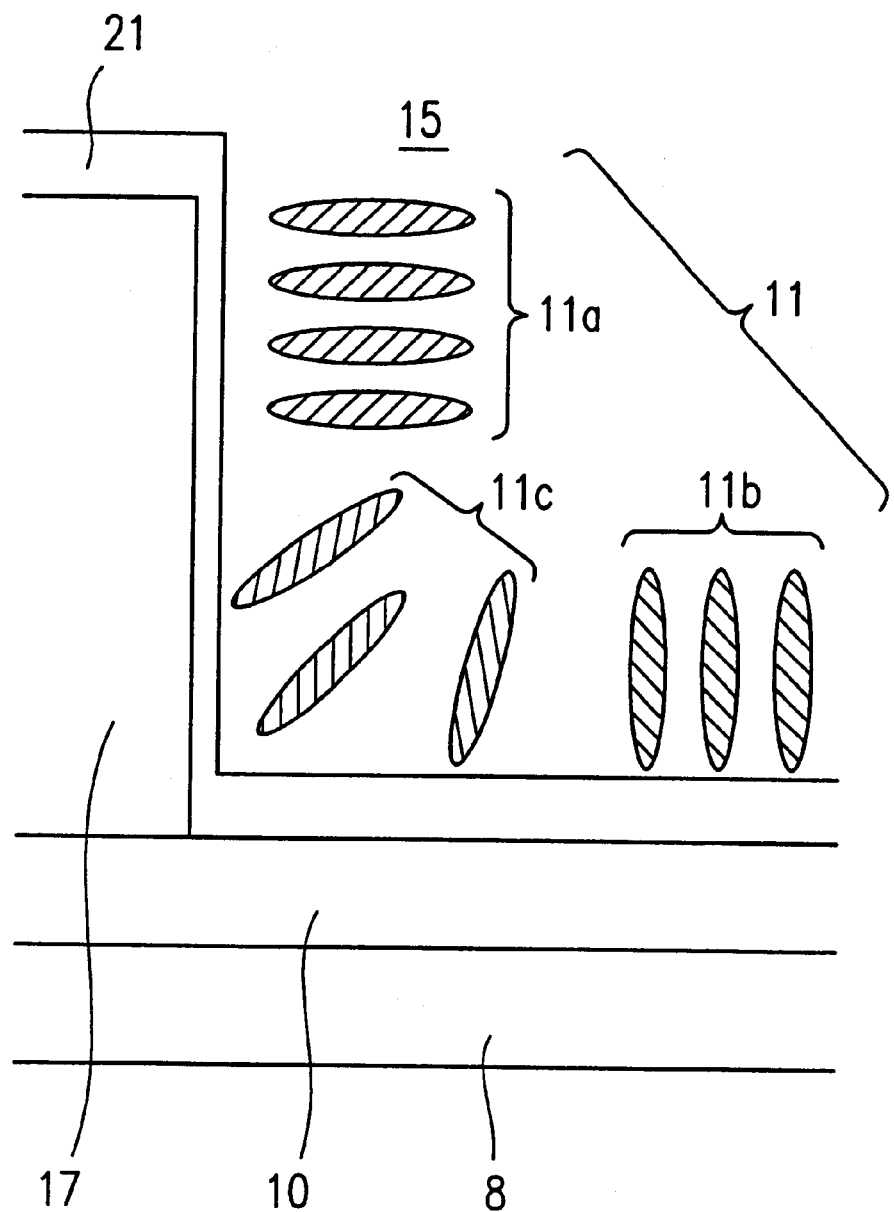
FIG. 2 is a schematic partial cross-sectional view of the conventional liquid crystal display device, illustrating an exemplary orientation of liquid crystal molecules.
Figure 3A:
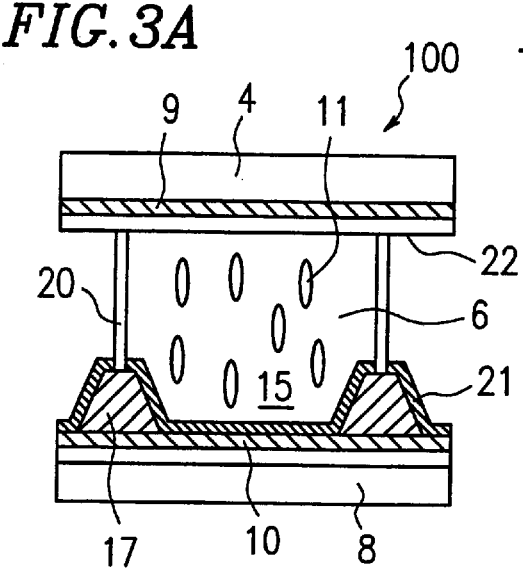
Figure 3C:
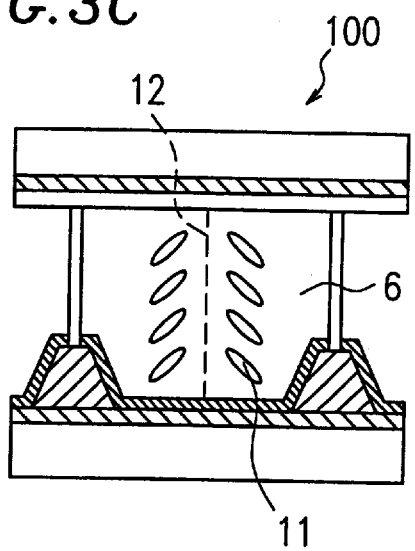
Figure 3B:
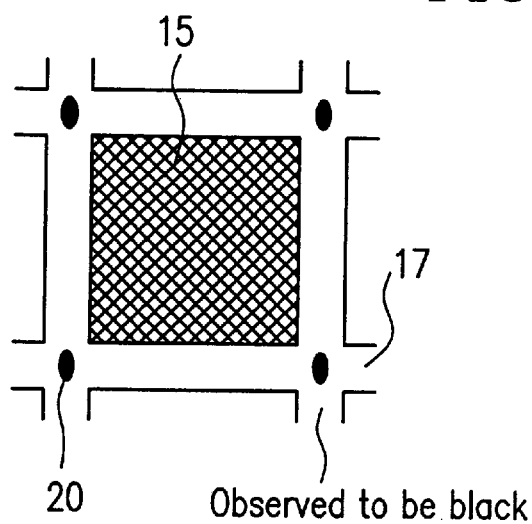
Figure 3D:
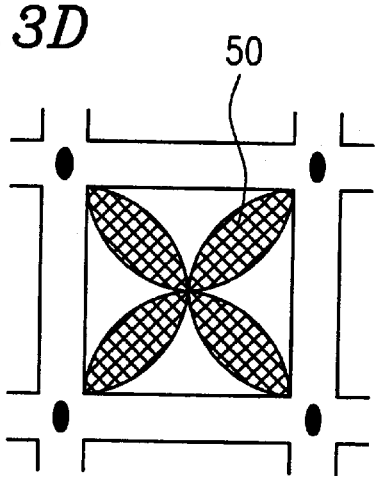

Referring to FIGS. 3A to 3D, a liquid crystal display device 100 and an operating principle thereof will be described below. FIG. 3A is a cross-sectional view illustrating the liquid crystal display device in the absence of an applied voltage, FIG. 3B illustrates polarization microscopy (in a crossed Nicols state) of the liquid crystal display device in the absence of an applied voltage, FIG. 3C is a cross-sectional view illustrating the liquid crystal display device in the presence of an applied voltage, and FIG. 3D illustrates polarization microscopy (in a crossed Nicols state) of the liquid crystal display device in the presence of an applied voltage.

The liquid crystal display device includes a pair of substrates 4 and 8, with a liquid crystal layer 6 having liquid crystal molecules with a negative dielectric anisotropy being interposed therebetween. Transparent electrodes 9 and 10 are formed on the substrates 4 and 8, respectively, each on the side closer to the liquid crystal layer 6. Vertical alignment layers 22 and 21 are provided on the transparent electrodes 9 and 10, respectively. Inclined partition walls 17 are provided on at least one of the substrates 4 and 8 on a side that faces the liquid crystal layer 6. Pillar-like spacers 20 may further be provided selectively on some of the partition walls 17. As will be discussed later in greater detail, the inclined partition walls 17 define a plurality of liquid crystal regions 15, in each of which the liquid crystal molecules are oriented in axial symmetry. Therefore, as illustrated in FIG. 3C, liquid crystal molecules 11 in each of the liquid crystal regions 15 defined by the partition walls 17 are oriented in axial symmetry about an axis 12 which is substantially perpendicular to the surfaces of the substrates 4 and 8. The vertical alignment layer may be provided on either one of the substrates 4 and 8.

In the absence of an applied voltage, as illustrated in FIG. 3A, liquid crystal molecules 11 are oriented in a direction substantially perpendicular to the substrates 4 and 8 by the anchoring force of the vertical alignment layers 21 and 22. When observed by a polarization microscope in a crossed Nicols state, a liquid crystal region 15 in the absence of an applied voltage exhibits a dark field (normally black mode), as illustrated in FIG. 3B. When a voltage is applied through the liquid crystal display device, a force acts upon the liquid crystal molecules 11 with a negative dielectric an isotropy and orients the molecules 11 so that the long axis of the molecules 11 is perpendicular to the direction of the electric field. As a result, the molecules 11 incline from a direction substantially perpendicular to the substrate, as illustrated in FIG. 3C (gray-level display state). When observed by a polarization microscope in a crossed Nicols state, the liquid crystal region 15 in this state exhibits an extinction pattern 50 along the polarization axis, as illustrated in FIG. 3D.

Figure 4:
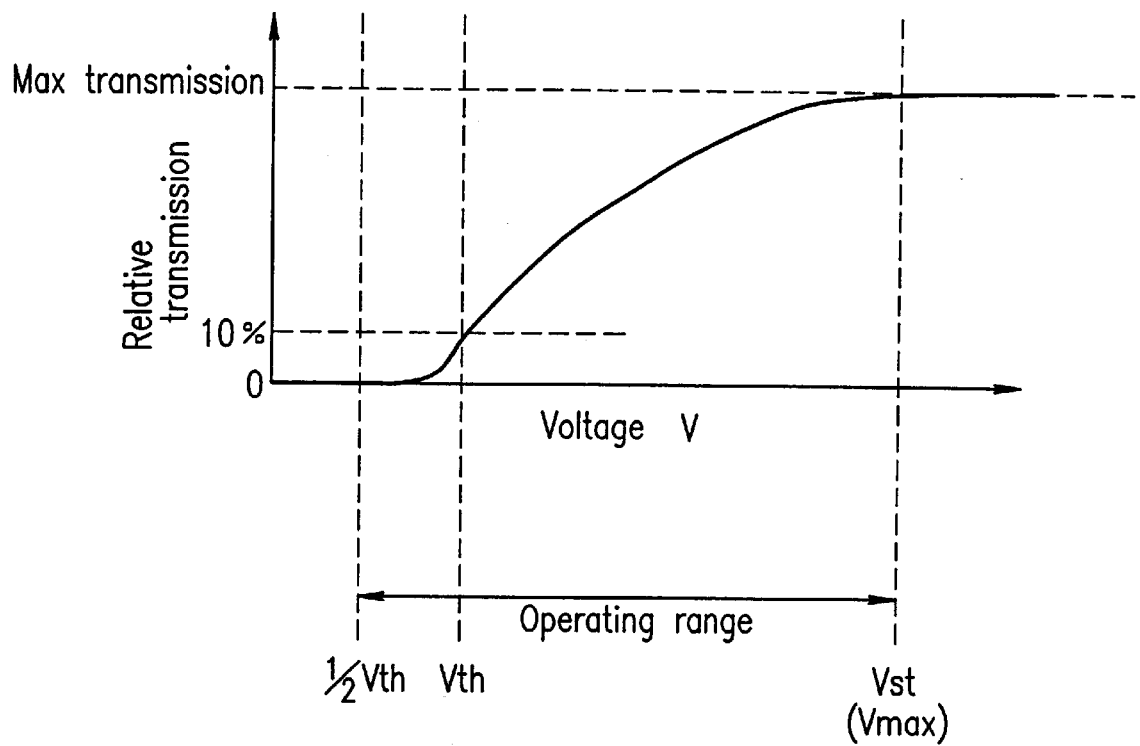
FIG. 4 is a graph illustrating a voltage-transmission curve of a liquid crystal display device of the present invention.

FIG. 4 illustrates a voltage-transmission curve for the liquid crystal display device of the present invention. In the liquid crystal display device 100 of the present embodiment of the invention, the liquid crystal molecules are preferably oriented in axial symmetry about a single central axis in each of the liquid crystal regions 15. The following operation is preferably performed in order to form the single central axis in each liquid crystal region 15.

In a liquid crystal cell which is obtained by simply injecting a liquid crystal material into a cell, a plurality of central axes may be formed within each of the liquid crystal regions 15 in the presence of an applied voltage, thereby forming a plurality of axially symmetric orientation regions within the liquid crystal region 15. In such a case, the voltage-transmission curve may have a hysteresis loop, where different optical transmissions may result at the same applied voltage when increasing the voltage and when decreasing the voltage.

When a gradually increasing voltage is applied through a liquid crystal cell (into which a liquid crystal material has been injected), a plurality of central axes 12 are initially formed. After continued voltage application at about ½ Vth or greater (Vth: a threshold voltage at which a relative transmission of about 10% is obtained with respect to the maximum transmission), the central axes 12 become a single central axis 12 in each of the liquid crystal regions 15 defined by the partition walls 17. Thus, such an operation of applying a voltage of about ½ Vth or greater is desired. Moreover, the liquid crystal display device 100 of the present embodiment of the invention is preferably driven by a voltage in the range from ½ Vth to Vst (Vst: a saturation voltage at which the maximum transmission is obtained). When the driving voltage is lower than ½ Vth, a plurality of central axes are formed again, whereby the voltage-transmission characteristic of the device may be unstable.

As described above, the liquid crystal display device of the present invention operates in a normally black mode. In the normally black mode, the liquid crystal molecules 11 are oriented in a direction perpendicular to the substrate (thereby producing a black display) in the absence of an applied voltage, whereas the liquid crystal molecules 11 are oriented in axial symmetry about the central axis 12 formed for each liquid crystal region 15 (thereby producing a white display) in the presence of an applied voltage. However, immediately after voltage application from the absence of an applied voltage, a plurality of axially symmetric orientation central axes 12 are formed, and the black level is likely to fluctuate, whereby the operation is unstable assuming the absence of an applied voltage corresponds to the black display. In order to achieve a stable operation under the display mode of the present invention, it is desirable to provide only one central axis 12 for each liquid crystal region 15 before initiating a display operation.

Partition Wall

In the liquid crystal display device of the present invention, the partition walls 17 are provided on at least one of the substrates so as to surround each liquid crystal region 15. The provision of the partition walls 17 defines the position and the size of the liquid crystal regions 15 in each of which the liquid crystal molecules 11 are oriented in axial symmetry. When there are no partition wall 17 and the thickness of the liquid crystal layer 6 (or the cell gap) is uniform, there will be a plurality of liquid crystal domains (a "liquid crystal domain" is a region across which the orientation of the liquid crystal molecules 11 is continuous with substantially no disclination line), thereby resulting in a random orientation state, and causing non-uniformity in a produced gray-level display.

Axially Symmetric Orientation

Figure 5:
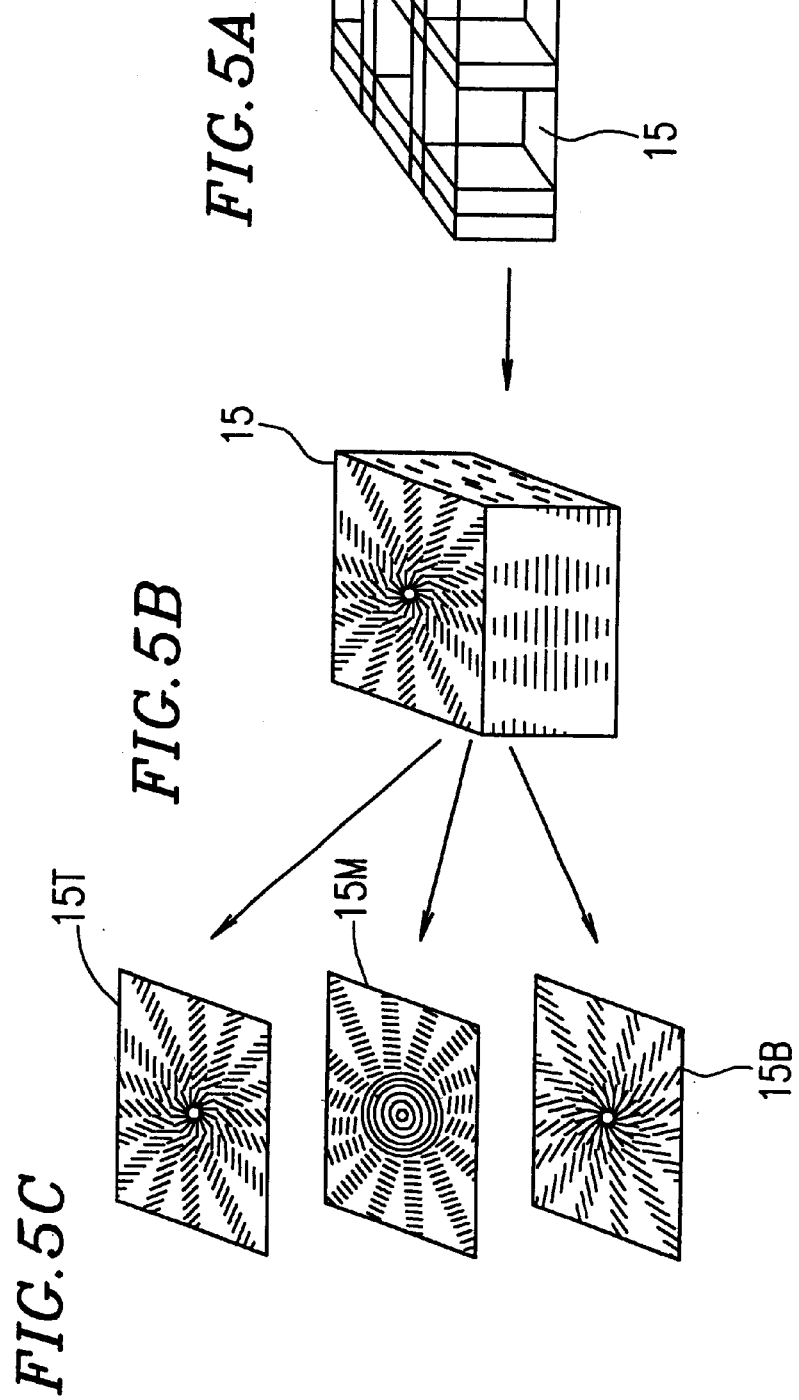
FIGS. 5A to 5C are schematic diagrams of a modeled liquid crystal region of a liquid crystal display device of the present invention, illustrating an orientation of liquid crystal molecules in the liquid crystal region.

FIGS. 5A to 5C illustrate modeling of a liquid crystal cell and an orientation of the liquid crystal molecules 11 in a bright state in one liquid crystal region 15. As illustrated in FIG. 5A, the liquid crystal layer is divided by the partition walls 17 into a plurality of liquid crystal regions 15 arranged in a matrix. In the example shown in FIG. 5A, each partition wall 17 extends fully between the upper and lower substrates to separate the liquid crystal regions 15 from one another. However, the present invention is not limited to such a partition wall arrangement. Alternatively, the partition wall 17 may only provide partial partition with a vertical dimension less than the cell gap of the display device. FIG. 5B is a schematic view illustrating one of the liquid crystal regions 15. In FIGS. 5B and 5C, short lines represent the directors of the liquid crystal molecules 11. The liquid crystal molecules 11 in the liquid crystal region 15 are controlled in an axially symmetric orientation in a bright state. In the example illustrated in FIGS. 5B and 5C, a chiral agent is added to the liquid crystal material beforehand, thereby realizing an axially symmetric orientation mode where the directors of the liquid crystal molecules 11 are arranged in a spiral pattern. In FIG. 5C, the directors of the liquid crystal molecules 11 in a top layer 15T, an intermediate layer 15M and a bottom layer 15B of the liquid crystal region 15. In the top layer 15T, the directors of the liquid crystal molecules 11 are arranged in a spiral pattern. In the intermediate layer 15M, the directors of the liquid crystal molecules 11 are rotated by approximately 45° due to the effect of the chiral agent and are arranged in a radial pattern as a whole. In the bottom layer 15B, the directors of the liquid crystal molecules 11 are further rotated by approximately 45°, and are arranged back in a spiral pattern. Thus, in the present invention, the directors of the liquid crystal molecules 11 are twisted by about 90° in total from the top layer 15T to the bottom layer 15B of the liquid crystal region 15.

The "axially symmetric orientation" as used herein refers to a spiral orientation, as illustrated in FIGS. 5A, 5B and 5C. In other embodiments, the present invention may also be used with a concentric orientation, a radial orientation, or the like. Moreover, the central axis of the axially symmetric orientation is generally in the direction normal to the substrate surface.

Partition Wall Material

A photosensitive resin, either positive or negative, may be used as the material for the partition wall. Photosensitive resins for use with the present invention may include an acrylate resin, a methacrylate resin, a styrene resin, a novolac resin, a polyimide resin, and any derivative thereof. Moreover, it is possible to more effectively cure the photosensitive resin by adding a photoinitiator thereto.

Inclined Section of Partition Wall and Inclination Angle

Figure 6:
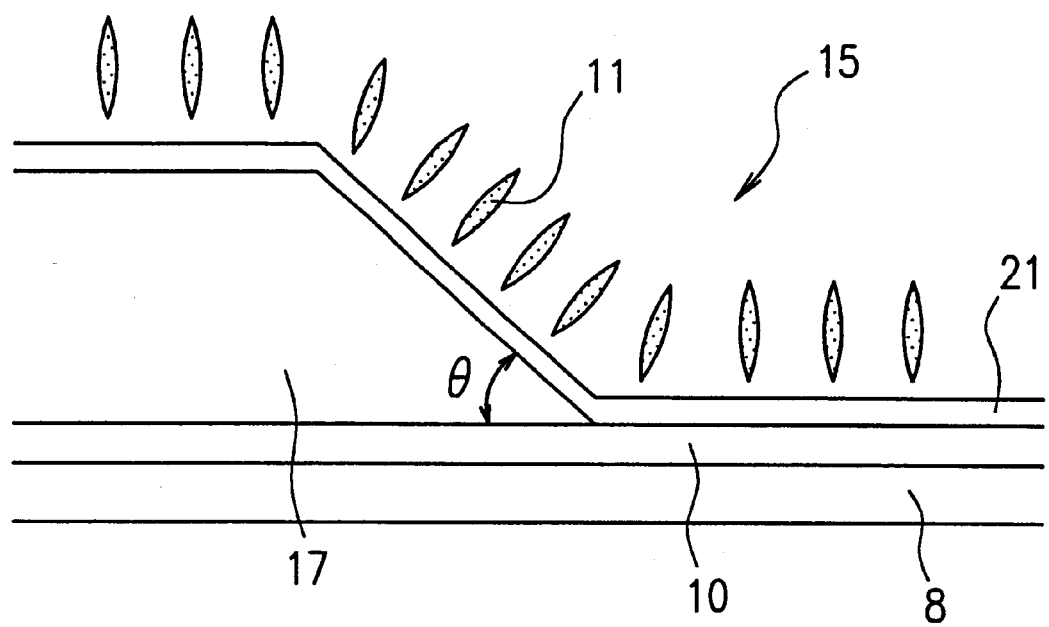
FIG. 6 is a schematic partial cross-sectional view illustrating an orientation of liquid crystal molecules in the absence of an applied voltage in a liquid crystal display device of the present invention.

FIG. 6 is a schematic partial cross-sectional view of a liquid crystal display device of the present invention, illustrating an orientation of the liquid crystal molecules 11 in the vicinity of a partition wall along the periphery of the liquid crystal region 15 in the absence of an applied voltage. The signal electrode 10 is provided on the glass substrate 8, and the partition wall 17 is provided on the glass substrate 8. Moreover, the vertical alignment layer 21 is provided on the top and side surfaces of the partition wall 17 and on the signal electrode 10. The partition wall 17 includes an inclined section which has an inclination angle (tapering angle) of θ with respect to the surface of the substrate. As shown in FIG. 6, in the absence of an applied voltage, the liquid crystal molecule 11 has a pretilt angle (with respect to the surface of the substrate) which varies continuously (not abruptly) from one molecule to the next even around the corner of the side surface of the partition wall 17 and the substrate 8. Thus, disturbance in the orientation of liquid crystal molecules is not likely to occur.

When the inclination angle of the partition wall is set to about 60° or less, it is possible to realize a stable axially symmetric orientation and to reduce the height of the partition wall 17. However, when the inclination angle is less than about 3°, the side surface effect which stably controls the liquid crystal molecules in an axially symmetric orientation is reduced or lost. Accordingly, the inclination angle of the partition wall is preferably about 3° to about 60°.

Relationship Between Partition Wall Height and Optical Transmission

Figure 7:
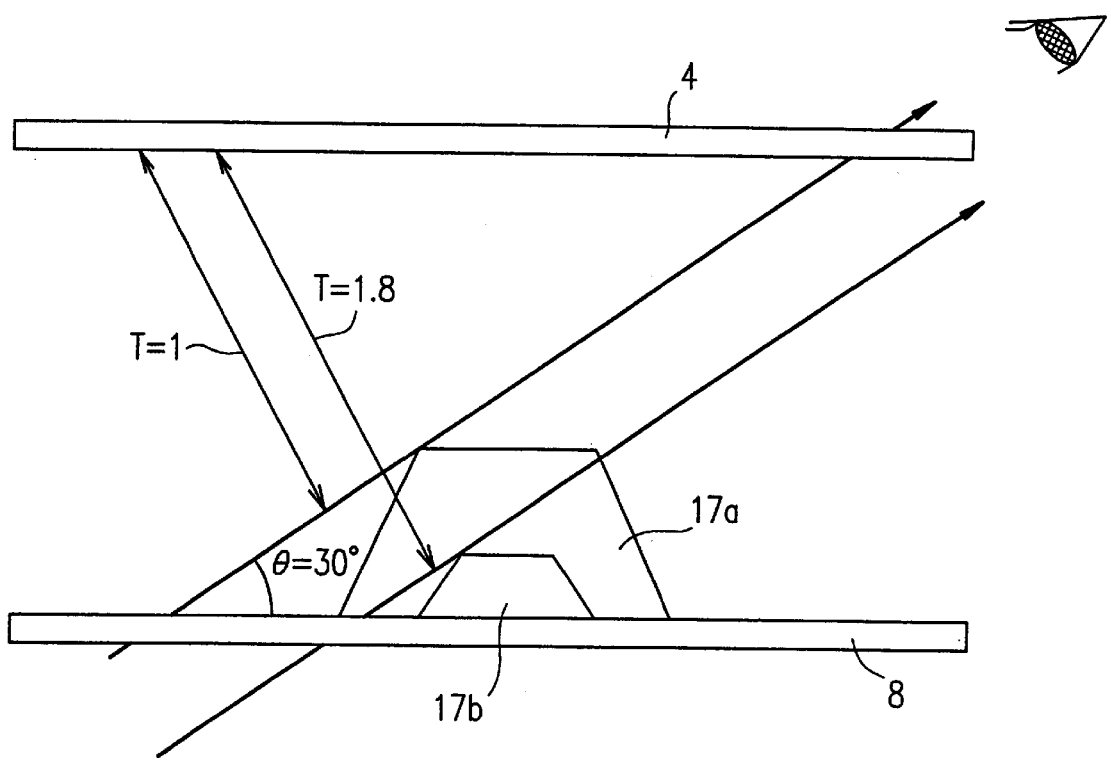
FIG. 7 is a schematic partial cross-sectional view illustrating a liquid crystal display device of the present invention.

FIG. 7 is a schematic partial cross-sectional view of a liquid crystal display device of the present invention, illustrating the relationship between the height of a partition wall and the optical transmission resulting when viewed from a direction inclined from the direction normal to the substrate surface. For the sake of simplicity, elements other than the glass substrates 4 and 8 and a partition wall 17a or 17b are not shown in the figure. The cell gap is set to about 6 μm. The partition wall 17a has a height of about 3 μm, and the partition wall 17b has a height of about 0.5 μm. As illustrated in FIG. 7, as the height of the partition wall 17 decreases, the amount of incident light transmitted through the liquid crystal region 15 and reaching the observer increases. For a viewing angle of about 30°, the optical transmission obtained with the 0.5 μm-tall partition wall 17b is about 1.8 times as much as that obtained with the 3 μm-tall partition wall 17a.

Production Process of Partition Wall

The partition wall is produced by applying a photosensitive resin on a substrate, and patterning the applied photosensitive resin through exposure, development, etc., with a photomask using a photolithography method.

A typical steps for this process is as follows.

(A) Apply a photosensitive resin film.

(B) Prebake the photosensitive resin film.

(C) Expose the photosensitive resin film.

(D) Develop the photosensitive resin film.

(E) Postbake the photosensitive resin film.

Inclination Angle Control

The inclination angle of the partition wall section can easily be controlled to a desired value by adjusting the conditions under which the partition wall is patterned and produced by a photolithography method. The conditions may include the exposure intensity, the exposure time, the prebake temperature, the mask gap, the development time, or the like. Any of these conditions may be used alone, or two or more conditions may be used in combination. Specific examples of how to control the inclination angle of the partition wall will later be described in detail.

Axially Symmetric Orientation Fixing Layer

As described above, a voltage of ½ Vth or greater is preferably continuously applied to the liquid crystal display device of the present invention. When a voltage is applied to the liquid crystal molecules 11 oriented in a direction perpendicular to the substrate surface, the direction in which the liquid crystal molecules 11 incline is not uniquely determined. As a result, there is a transitional state where a plurality of central axes exist in a liquid crystal region defined by the partition walls. After a continued voltage application, there will be only one central axis in the liquid crystal region. This state will stably be maintained as long as a voltage of ½ Vth or greater is applied.

In order to realize the stable axially symmetric orientation and a high speed operation, axially symmetric orientation fixing layers 23 and/or 24 (see FIG. 13A) may be provided on a side of at least one of the substrates closer to the liquid crystal layer, rather than constantly applying a voltage of ½ Vth or greater while the display device is producing a black display. The axially symmetric orientation fixing layer can be provided by, for example, providing a precursor mixture containing at least a liquid crystal material and a curable resin between a pair of substrates, and curing the mixture in the presence of a voltage of ½ Vth or greater. After the resin is cured, since the axially symmetric orientation fixing layer is formed, an axially symmetric pretilt angle can be provided to the liquid crystal molecules 11 for each of the liquid crystal region 15 where the liquid crystal molecules 11 are oriented in axial symmetry even without an applied voltage of ½ Vth or greater. Due to the axially symmetric orientation fixing layer, the liquid crystal molecules 11 can be provided with a pretilt angle even in the absence of an applied voltage, the inclination of the liquid crystal molecules 11 with respect to the direction normal to the substrate surface is slight, thereby obtaining a black level comparable to that obtained when the axially symmetric orientation fixing layer is not provided.

The curable resin used with the present invention may be a photocurable resin, a thermosetting resin, or the like. Such a photocurable resin may include an acrylate resin, a methacrylate resin, a styrene resin, and any derivative thereof. Moreover, it is possible to more effectively cure the photosensitive resin by adding a photoinitiator thereto.

The optimal amount of curable resin to be added varies depending upon the particular material used, and is not limited to any specific value in the present invention. However, the resin weight content should preferably be about 0.1% by weight to about 5% by weight with respect to the total weight of the material including the weight of the liquid crystal material. Below about 0.1% by weight, the axially symmetric orientation cannot be stabilized by the cured resin. Over about 5% by weight, the curing of the vertical alignment layer is inhibited, whereby the liquid crystal molecules 11 are offset from the vertical orientation, thereby excessively increasing the optical transmission (leading to light leakage) and deteriorating the black display in a voltage-OFF state.

Pixel Region and Pixel

The term "pixel region" as used herein will be described. The liquid crystal display device of the present invention includes a plurality of pixel regions for producing a display. A "pixel", the minimum unit of display, includes a plurality of pixel regions. Typically, in an active matrix liquid crystal display device which includes a counter electrode and a plurality of pixel electrodes arranged in a matrix and switched by the respective active elements (e.g., TFTs), each pixel region includes one pixel electrode, a corresponding region on the counter electrode and a liquid crystal region therebetween. In a passive matrix liquid crystal display device which includes stripes of scanning electrodes and stripes of signal electrodes arranged on the respective substrates so as to cross each other with a liquid crystal layer interposed therebetween, each pixel region includes a portion of a scanning electrode and a portion of a signal electrode at the intersection therebetween and a liquid crystal region therebetween.

The present invention is not limited to the case where one pixel region corresponds to one liquid crystal region. However, it is preferable in view of improving the display quality to provide the liquid crystal regions so as to correspond to the pixel regions, respectively. When using a long pixel with a large aspect ratio, a plurality of pixel regions may be provided for each of such long pixels. The number of liquid crystal regions provided for each pixel is preferably as small as possible as long as the axially symmetric orientation is stably provided.

More specific examples of the present invention will now be described in detail, which are meant to be illustrative only and not to limit the present invention.

EXAMPLE 1

Figure 8A:
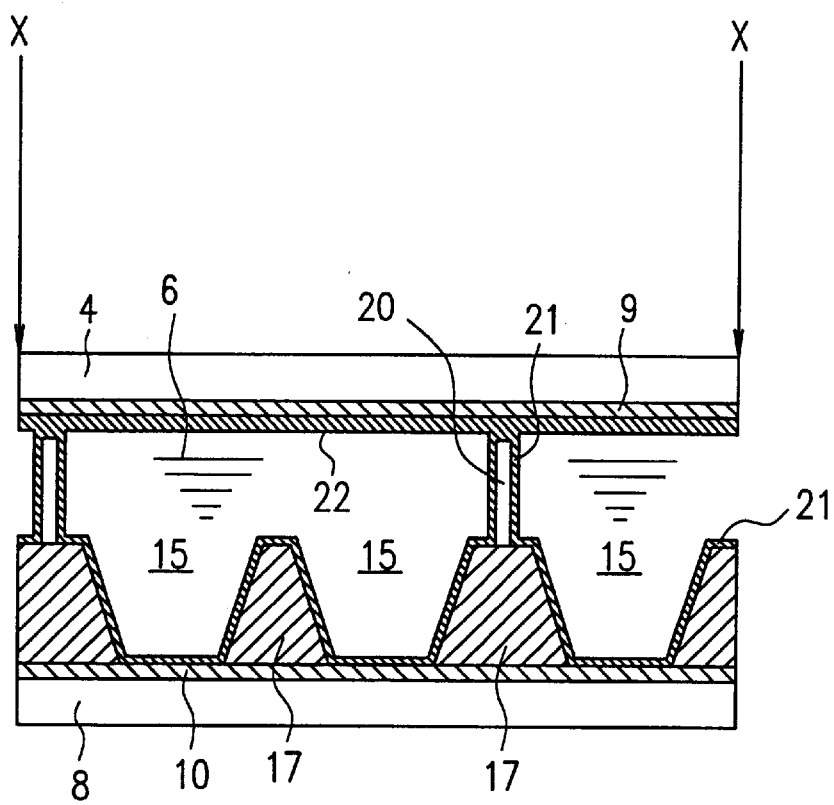
FIGS. 8A and 8B are schematic diagrams illustrating a liquid crystal display device according to Example 1 of the present invention.
Figure 8B:
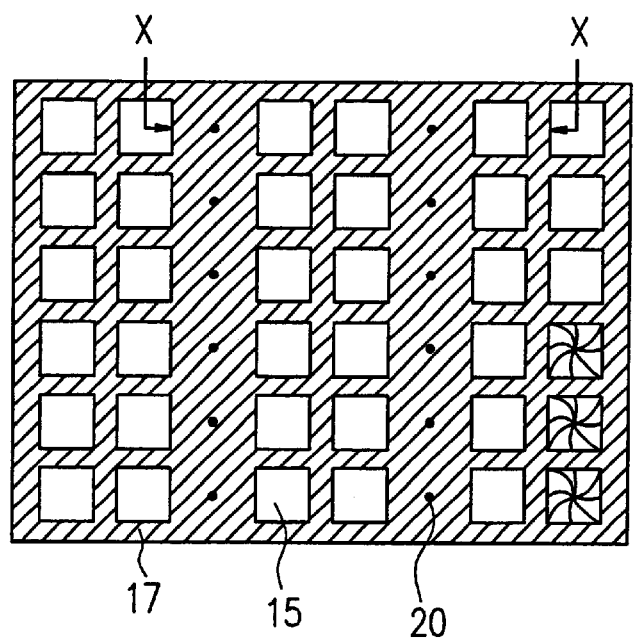

FIGS. 8A and 8B are schematic views of a liquid crystal display device according to Example 1 of the present invention. The transparent electrode 9 of ITO, for example, having a thickness of about 100 nm is provided on one of the glass substrates 4. The vertical alignment film 22 is provided on the transparent electrode 9 by, for example, spin-coating JALS-204 (from Japan Synthetic Rubber Ltd.), or the like. The other transparent electrode 10 of ITO, or the like, having a thickness of about 100 nm is provided on the other glass substrate 8.

Then, the partition walls 17 are provided by the above-described process. An acrylic negative resist is applied on the glass substrate 8 to a height of about 1 $\mu$m using a spin coater, for example, followed by a prebake process at about 90° C. for about 120 seconds. The substrate is then irradiated for about 50 seconds with UV light at about 10 mW/cm$^2$ with a mask gap set to about 300 $\mu$m. Thereafter, a development process is performed for about 10 minutes using CD (from FUJIFILM OLIN CO., LTD.) as a developing solution, after which the substrate is washed and dried, and postbaked at about 220° C. for about 1 hour. The partition walls 17 are provided on the glass substrate 8, as illustrated in FIGS. 8A and 8B, so as to substantially surround the liquid crystal regions 15 and to have inclined sections on both side surfaces thereof. The size of each liquid crystal region 15 is set to about 120 $\mu$m×about 200 $\mu$m, for example.

Next, the pillar-like spacers 20 are patterned on the partition wall 17 by a photolithography method using a photosensitive resin, e.g., a photosensitive polyimide. JALS-204 (from Japan Synthetic Rubber Ltd.), or the like, is spin-coated to provide the vertical alignment layer 21 on the glass substrate 8 including the partition wall 17 and the pillar-like spacers 20 provided thereon. The substrates are attached to each other, and an n-type liquid crystal material ($\Delta\epsilon$=about −4.0, $\Delta n$=about 0.08, with a twist angle inherent to the liquid crystal material adjusted to about 90° twist within a cell gap of about 6 $\mu$m) to provide the liquid crystal layer 6 between the substrates, thereby producing a liquid crystal display cell.

A voltage of about 7 V is applied across the cell, in order to define an orientation axis of the liquid crystal molecules within the produced display cell. Immediately after the voltage application, a plurality of orientation axes are initially formed. After a continued voltage application, there will be only one orientation axis in each liquid crystal region 15 which then has only one axially symmetric orientation region ("monodomain").

Polarizers are provided on the respective sides of the liquid crystal display cell in a crossed Nicols state, thereby producing the liquid crystal display device.

Figure 9:
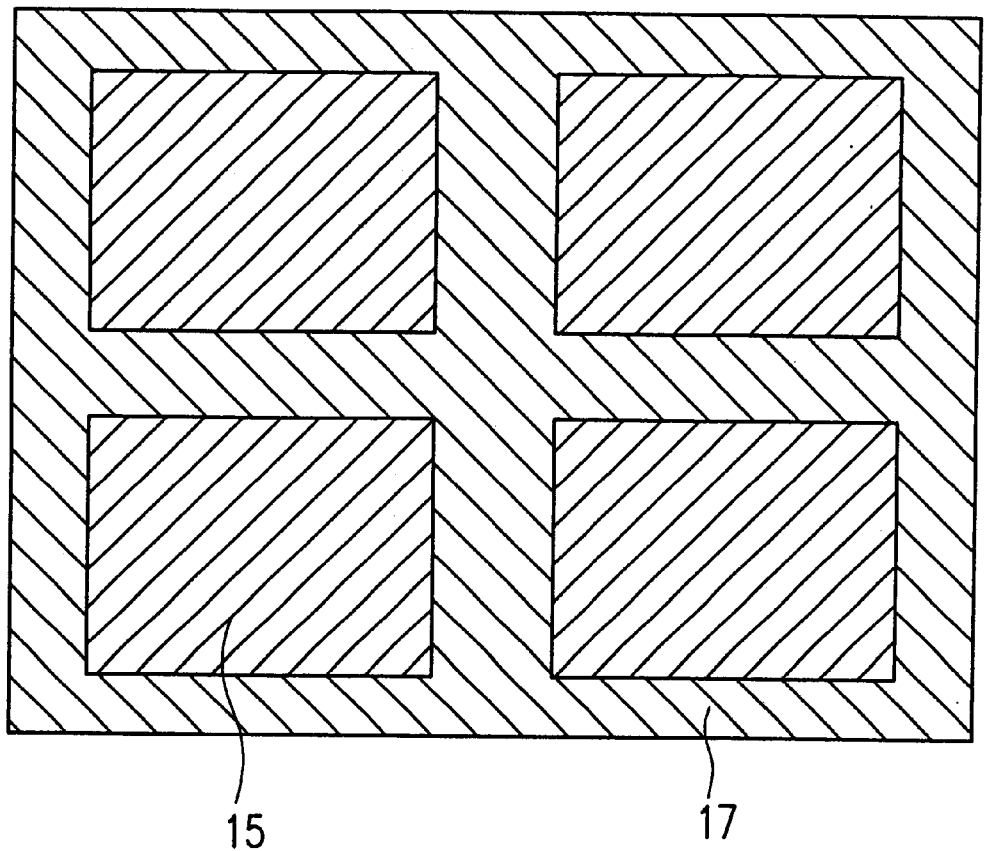
FIG. 9 is a schematic diagram illustrating polarization microscopy (in a crossed Nicols state) of a pixel of the liquid crystal cell produced in Example 1 of the present invention.

The liquid crystal region 15 of an actually produced liquid crystal display device in a transmission mode was observed with a polarization microscope (in a crossed Nicols state) in the absence of an applied voltage. FIG. 9 is a schematic diagram illustrating polarization microscopy of the liquid crystal regions 15 separated by the partition wall 17 of the liquid crystal display device of Example 1 of the present invention. The liquid crystal region 15 in the absence of an applied voltage exhibits a dark field since the display device operates in the normally black mode. In FIG. 9, the partition wall 17 and the liquid crystal region 15 are distinguished from each other by being hatched in different manners for illustrative purposes, whereby each boundary between the partition wall 17 and the liquid crystal region 15 is distinctive. In practice, however, the boundary between the partition wall 17 and the liquid crystal region 15 is generally not distinctive when viewed with a polarization microscope in a crossed Nicols state. As can be seen in FIG. 9, there was no substantial light leakage in a black display across the display cell, thereby obtaining a high contrast ratio.

EXAMPLE 2

In Example 2 of the present invention, the liquid crystal display device of Example 1 is applied to a plasma-addressed liquid crystal display device.

Figure 10A:
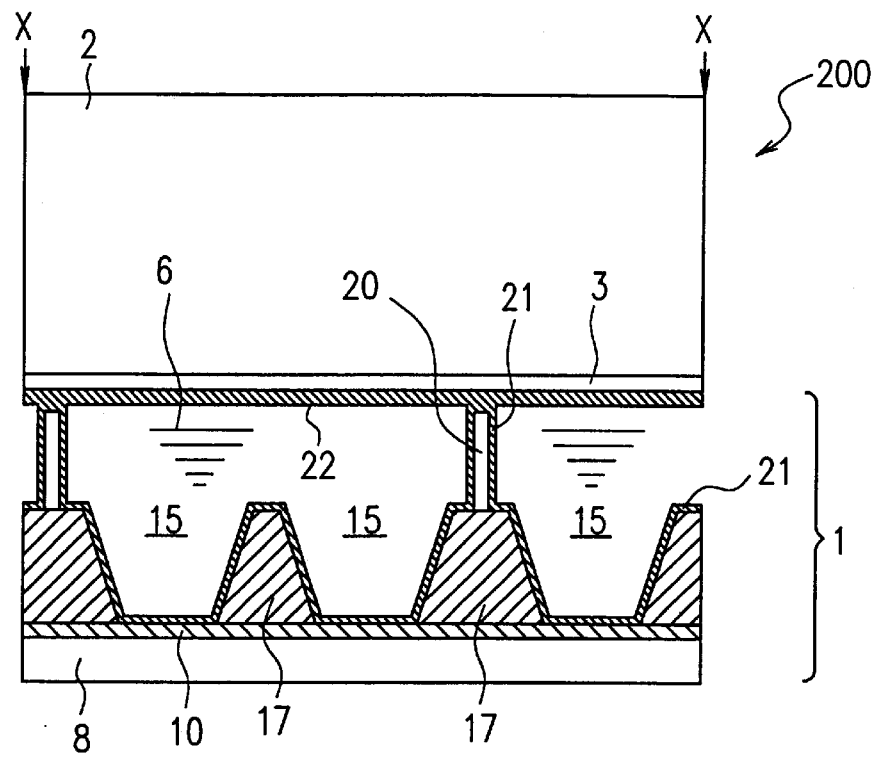
FIGS. 10A to 10C are schematic diagrams illustrating a liquid crystal display device according to Example 2 of the present invention.
Figure 10B:
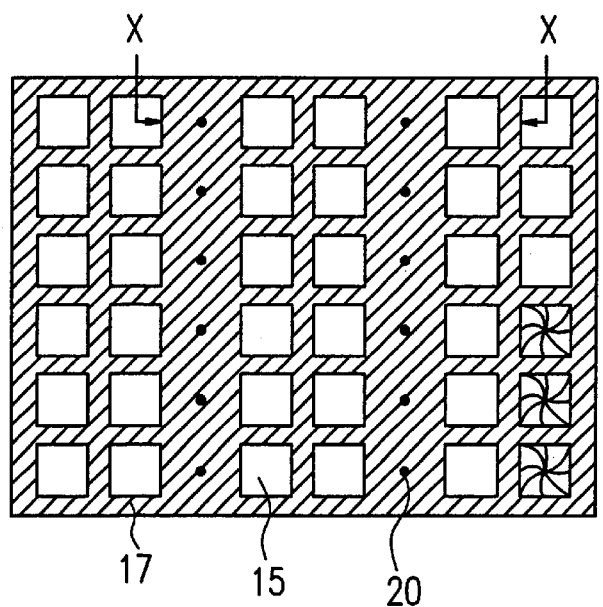
Figure 10C:
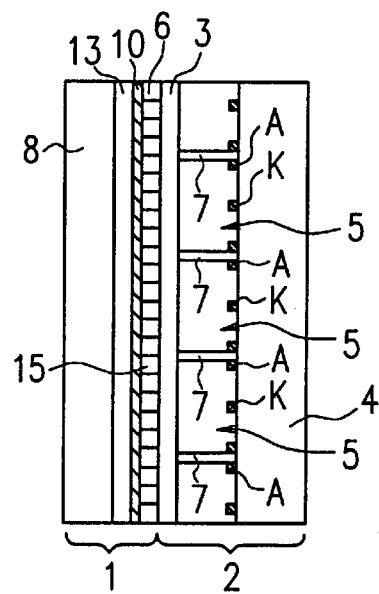

FIGS. 10A to 10C illustrate a plasma-addressed liquid crystal display device 200 of a flat panel structure, including: a display cell 1 for producing a pixel-wise display by modulating incident light into output light according to pixel signals; and a plasma cell substrate 2 for scanning (or addressing) the pixels. The display cell 1 and the plasma cell substrate 2 share a dielectric sheet 3. The dielectric sheet 3 functions as an upper substrate of the display cell 1 and as a lower substrate of the plasma cell substrate 2.

As shown in FIG. 10C, the plasma cell substrate 2 includes the substrate 4 (e.g., a glass substrate), the dielectric sheet 3 and discharge channels 5 arranged in rows each surrounded by ribs 7. The plasma cell substrate 2 successively generates plasma discharge to scan the display cell 1 in a linear sequential manner. The discharge channels 5 define rows of space, each of which includes an anode electrode A and a cathode electrode K. Although not shown in the figures, it is understood that other components required for driving the plasma-addressed liquid crystal display device 200 are also provided separately, including a power source circuit for applying a voltage to the anode electrode A and the cathode electrode K for generating plasma discharge, and a scanning circuit for controlling the scanning process, etc. The components for driving the plasma-addressed liquid crystal display device 200 may be those components used in a conventional plasma-addressed liquid crystal display device.

The display cell 1 includes a plurality of the signal electrodes 10 arranged in columns so as to substantially perpendicularly cross the discharge channels 5 arranged in rows, thereby defining a pixel at each intersection therebetween. The signal electrodes 10 may be provided on the partition wall 17. Preferably, the signal electrodes 10 are formed between the partition wall 17 and a color filter layer 13. Moreover, an overcoat layer (not shown) may be provided on the color filter layer 13. Each pixel of the liquid crystal layer 6 is driven by a voltage applied through the liquid crystal layer 6 in a linear sequential manner from the discharge channel 5 via the dielectric sheet 3 and a voltage applied through the signal electrode 10 as a data signal is provided to the signal electrode 10 in synchronization with the linear sequential scanning, thereby modulating the incident light.

The plasma cell substrate 2 is provided by attaching the glass substrate 4 (on which the ribs 7, the anode electrodes A and the cathode electrodes K have been provided) to the lower surface of the dielectric sheet 3. The display cell 1 is provided by attaching the glass substrate 10 (on which the color filter layer 13, the groove structure 11 and the signal electrode 14 have been provided) to the lower surface of the dielectric sheet 3. The thickness of the liquid crystal layer 6 (or the cell gap) is defined by the partition wall 17 and the pillar-like spacer 20. A vertical alignment layer 21 (and/or 22) is provided on the respective surfaces of the substrate 8 (on which the signal electrode 10 and the partition wall 17 have been provided) and the dielectric sheet 3 closer to the liquid crystal layer 6.

Polarizers are provided on the respective substrates (which interpose the liquid crystal layer therebetween, providing the display cell) so that the respective polarization axes thereof substantially perpendicularly cross each other. At least one of the substrates is provided with a phase difference plate with a negative refractive index anisotropy between the substrate and the associated polarizer. The provision of the phase difference plate further improves the viewing angle characteristic of the liquid crystal display device.

A voltage of about 7 V is applied across the cell, in order to define an orientation axis of the liquid crystal molecules within the produced display cell. Immediately after the voltage application, a plurality of orientation axes are initially formed. After a continued voltage application, there will be only one orientation axis in each liquid crystal region 15 which then has only one axially symmetric orientation region ("monodomain").

Polarizers are provided on the respective sides of the liquid crystal display cell in a crossed Nicols state, thereby producing the liquid crystal display device. The liquid crystal region 15 of an actually produced liquid crystal display device in a transmission mode was observed with a polarization microscope (in a crossed Nicols state) in the absence of an applied voltage. As in Example 1, there was no substantial light leakage in a black display across the display cell, thereby obtaining a high contrast ratio.

Comparative Example 1

Figure 11A:
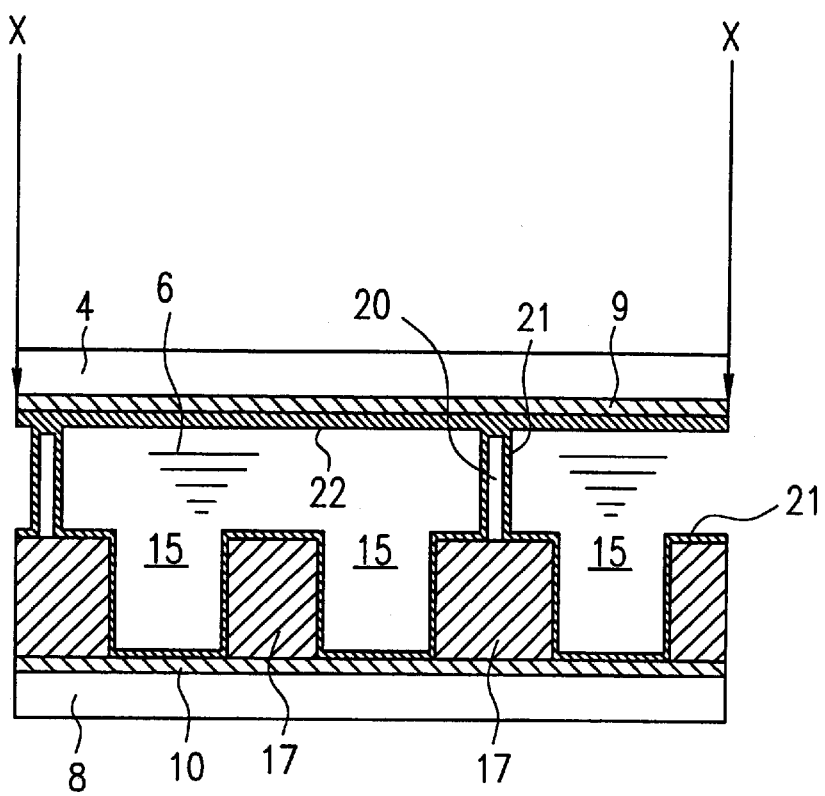
FIGS. 11A and 11B are schematic diagrams illustrating a liquid crystal display device according to Comparative Example 1.
Figure 11B:
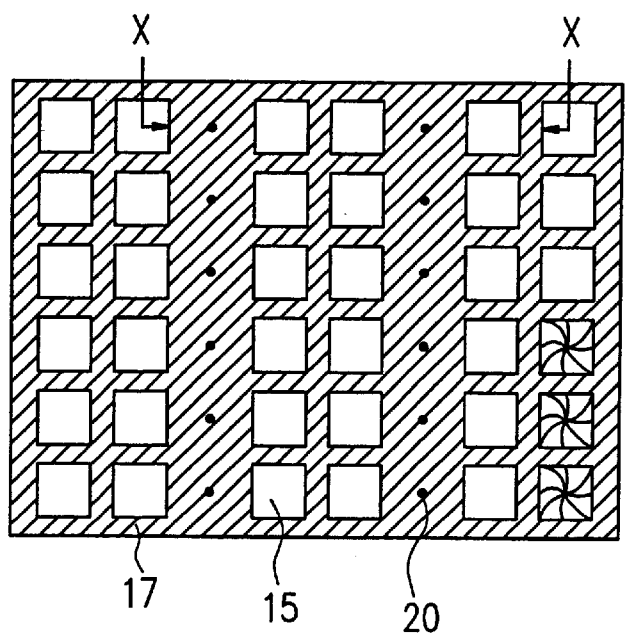

FIGS. 11A and 11B illustrate a liquid crystal display device of Comparative Example 1 which is produced in a manner similar to that of Example 1, but using different conditions for producing the partition walls 17, so that the side surface of the partition wall 17 is substantially perpendicular to the substrate surface (i.e., the partition wall 17 has a substantially rectangular cross section).

The partition wall 17 is provided by a process substantially the same as that described above. An acrylic negative resist is applied on the glass substrate 8 to a height of about 3 μm using a spin coater, for example, followed by a prebake process at about 80° C. for about 120 seconds. The substrate is then irradiated for about 50 seconds with UV light at about 10 mW/cm$^2$ without a mask gap. Thereafter, a development process is performed for about 10 minutes using CD (from FUJIFILM OLIN CO., LTD.) as a developing solution, after which the substrate is washed and dried, and postbaked at about 220° C. for about 1 hour.

The partition wall 17 are provided on the glass substrate 8 so as to substantially surround the liquid crystal regions 15. The size of each liquid crystal region 15 is set to about 120 μm×about 200 μm, for example. As illustrated in FIGS. 11A and 11B, the side surface of the partition wall 17 is substantially perpendicular to the substrate surface.

Next, as in Example 1, the pillar-like spacers 20 are patterned on the partition wall 17 by a photolithography method using a photosensitive resin, e.g., a photosensitive polyimide. JALS-204 (from Japan Synthetic Rubber Ltd.), or the like, is spin-coated to provide the vertical alignment layer 21 on the glass substrate 8 including the partition wall 17 and the pillar-like spacers 20 provided thereon. The substrates are attached to each other, and an n-type liquid crystal material (Δε=about −4.0, Δn=about 0.08, with a twist angle inherent to the liquid crystal material adjusted to about 90° twist within a cell gap of about 6 μm) to provide the liquid crystal layer 6 between the substrates, thereby producing a liquid crystal display cell.

A voltage of about 7 V is applied across the cell, in order to define an orientation axis of the liquid crystal molecules within the produced display cell. Immediately after the voltage application, a plurality of orientation axes are initially formed. After a continued voltage application, there will be only one orientation axis in each liquid crystal region 15 which then has only one axially symmetric orientation region ("monodomain").

Polarizers are provided on the respective sides of the liquid crystal display cell in a crossed Nicols state, thereby producing the liquid crystal display device.

Figure 12:
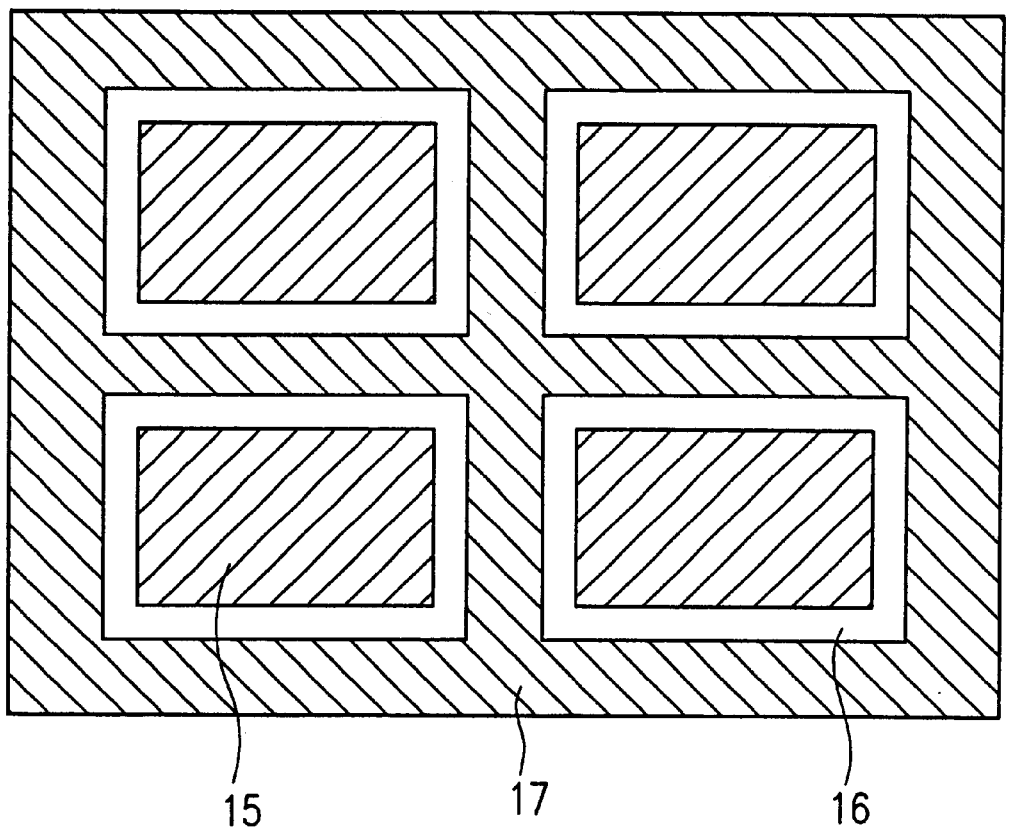
FIG. 12 is a schematic diagram illustrating polarization microscopy (in a crossed Nicols state) of a pixel of the liquid crystal cell produced in Comparative Example 1.

The liquid crystal region 15 of an actually produced liquid crystal display device in a transmission mode was observed with a polarization microscope (in a crossed Nicols state) in the absence of an applied voltage. FIG. 12 is a schematic diagram illustrating polarization microscopy of the liquid crystal regions 15 separated by the partition wall 17 of the liquid crystal display device of Comparative Example 1. The liquid crystal region 15 in the absence of an applied voltage exhibits a dark field across a major part of the liquid crystal region 15, since the display device operates in the normally black mode. However, a bright white line was observed along the periphery of the liquid crystal region 15 in the vicinity of the partition wall 17. In FIG. 12, the white bright line is indicated as a white region 16 as distinguished from the other part of the liquid crystal region 15 exhibiting the dark field. It is believed that the region 16 was observed in Comparative Example 1 because of some light leakage occurring due to disturbance in the orientation of liquid crystal molecules. Accordingly, the contrast ratio and the display quality of the display device were reduced from those of the present invention.

EXAMPLE 3

Figure 13A:
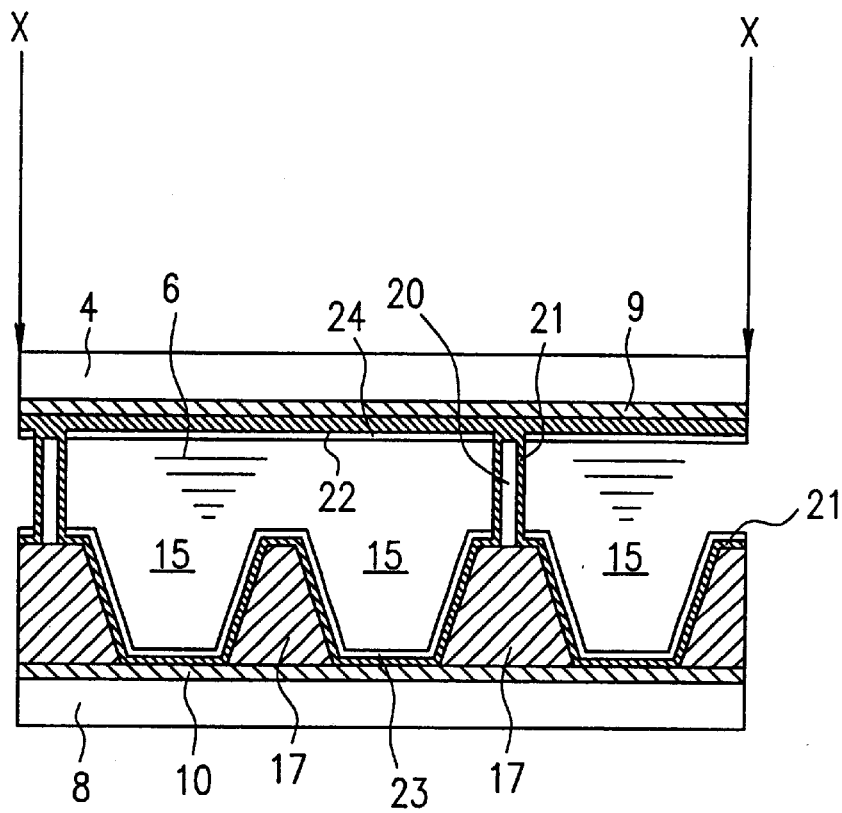
FIGS. 13A and 13B are schematic diagrams illustrating a liquid crystal display device according to Example 3 of the present invention.
Figure 13B:
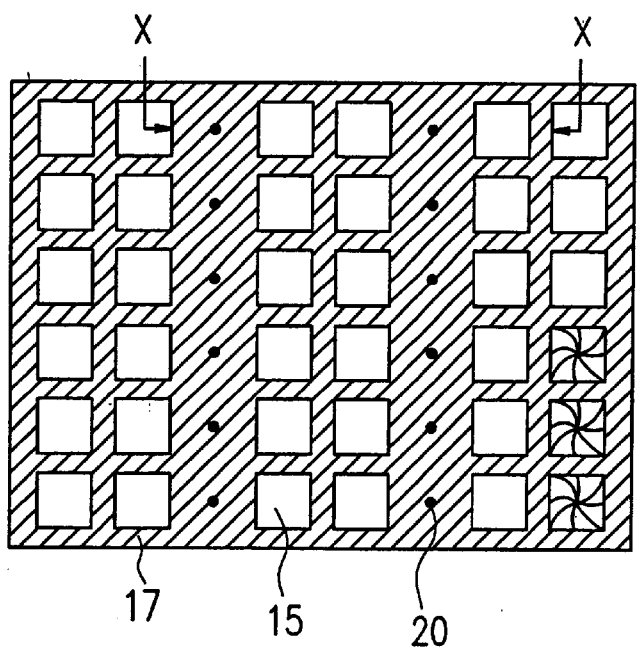

FIGS. 13A and 13B are schematic views of a liquid crystal display device according to Example 3 of the present invention which is produced in a manner similar to that of Example 1. The liquid crystal display device according to Example 3 includes the partition wall 17 with an inclined section provided on at least one of the substrates, and the axially symmetric orientation fixing layer 23 (and/or 24) provided on a surface of at least one of the substrates closer to the liquid crystal layer.

The partition wall 17 is provided by a process substantially the same as that described above. An acrylic negative resist is applied on the glass substrate 8 to a height of about 1 μm using a spin coater, for example, followed by a prebake process at about 80° C. for about 120 seconds. The substrate is then irradiated for about 50 seconds with UV light at about 10 mW/cm² with a mask gap of about 100 μm. Thereafter, a development process is performed for about 3 minutes using CD (from FUJIFILM OLIN CO., LTD.) as a developing solution, after which the substrate is washed and dried, and postbaked at about 220° C. for about 1 hour. Thus, the partition wall 17 is provided with a height of about 1 μm and a tapering angle of about 40°.

In the present example, a mixture is injected into the produced liquid crystal cell. The mixture contains an n-type liquid crystal material (Δε=about −4.0, Δn=about 0.08, with a twist angle inherent to the liquid crystal material adjusted to about 90° twist within a cell gap of about 5 μm) and, as a photocurable material, about 0.3 wt % of a compound represented by Formula 1 below and about 0.1 wt % of Irgacur 651. After the injection, a voltage of about 5 V is applied across the cell, in order to define an orientation axis of the liquid crystal molecules within the produced display cell. In the presence of the orientation-axis-defining voltage across the cell, the cell is irradiated for about 10 minutes with UV light at a room temperature (e.g., about 25° C.) and at an intensity of about 6 mW/cm² at about 365 nm, thereby curing the photocurable material in the mixture. The axially symmetric orientation fixing layer 23 (and/or 24) is provided on the vertical alignment layer 21 on each of the substrates.

FORMULA 1

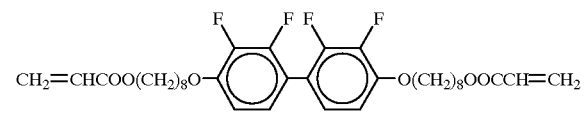

The liquid crystal region 15 of an actually produced liquid crystal display device in a transmission mode was observed with a polarization microscope (in a crossed Nicols state). When a voltage of ½ Vth or greater was applied across the liquid crystal layer in the absence of an applied voltage, the transitional state (where there are a plurality of axially symmetric orientation central axes 12) did not occur, but instead a single central axis was provided immediately after the voltage application.

Thus, it is possible to electrically and reversibly switch between the vertical orientation (i.e., black display) and the axially symmetric orientation (i.e., white display) without having to constantly apply a voltage of ½ Vth or greater in a black display. Accordingly, it is possible to control the axially symmetric orientation more stably.

Polarizers are provided on the respective sides of the liquid crystal display cell in a crossed Nicols state, thereby producing the liquid crystal display device.

The liquid crystal region 15 of an actually produced liquid crystal display device in a transmission mode was observed with a polarization microscope (in a crossed Nicols state) in the absence of an applied voltage. As in Example 1, there was no substantial light leakage in a black display across the display cell, thereby obtaining a high contrast ratio.

EXAMPLE 4

A liquid crystal display device according to Example 4 of the present invention is obtained in a manner substantially the same as that of Example 3, except that for each pixel a larger number of liquid crystal regions 15 each having a smaller size are provided.

The partition wall 17 are provided, by the production process as described above, on the glass substrate 8 with a height of about 1 μm and a tapering angle of about 45°. The size of the liquid crystal region 15 defined by the partition wall 17 is set to be about 15 μm×about 15 μm. Other than this, the liquid crystal display cell is produced in substantially the same way as in Example 3.

Polarizers are provided on the respective sides of the liquid crystal display cell in a crossed Nicols state, thereby producing the liquid crystal display device.

The liquid crystal region 15 of an actually produced liquid crystal display device in a transmission mode was observed with a polarization microscope (in a crossed Nicols state) in the absence of an applied voltage. As in Example 1, there was no substantial light leakage in a black display across the display cell, thereby obtaining a high contrast ratio.

EXAMPLES 5 AND 6

Comparative Examples 2 and 3

Liquid crystal display devices of Examples 5 and 6 of the present invention and Comparative Examples 2 and 3 are obtained in a manner substantially the same as that of Example 3, but with varied conditions for producing the partition wall, and thus with varied inclination angles of the partition wall.

The partition wall 17 are provided, by the production process as described above, on the glass substrate 8 with a height of about 1 μm. The size of the liquid crystal region 15 defined by the partition walls 17 is set to be about 112 μm×about 114 μm. Other than this, the liquid crystal display cell is produced in substantially the same way as in Example 3.

Polarizers are provided on the respective sides of the liquid crystal display cell in a crossed Nicols state, thereby producing the liquid crystal display device in each of Examples 5 and 6 of the present invention and Comparative Examples 2 and 3. The liquid crystal region 15 of an actually produced liquid crystal display device in a transmission mode was observed with a polarization microscope (in a crossed Nicols state) in the absence of an applied voltage for the presence/absence of light leakage in the vicinity of the partition wall 17 along the periphery of the liquid crystal region 15. Moreover, in the presence of a voltage of about 7 V, the liquid crystal region 15 was observed with a polarization microscope (in a crossed Nicols state) in the transmission mode for determining if the axially symmetric orientation is achieved in the liquid crystal region 15.

TABLE 1

| Example | Inclination Angle | Light leakage | Axially symmetric (AS) orientation stability | Aperture ratio | Overall evaluation |
|---|---|---|---|---|---|
| Example 5 | 30° | No | Stable AS orientation provided | 0.97 | ○ |
| Example 6 | 45° | No | Stable AS orientation provided | 0.98 | ○ |
| Comparative Example 2 | 67° | Yes | AS orientation provided but unstable | 0.99 | X |
| Comparative Example 3 | 90° | Yes | No AS orientation provided | 1.0 | X |

In Table 1 above, the aperture ratio is relative to the aperture ratio of the liquid crystal display device of Comparative Example 3 being 1.0.

The symbol "○" in Table 1 indicates good overall evaluation where there is substantially no light leakage in the absence of an applied voltage (a black display) and a stable axially symmetric orientation is achieved in the presence of an applied voltage (a white display). The symbol "×" indicates a poor overall evaluation.

As can be seen from Table 1 above, in Comparative Example 3 (where the partition wall 17 has a substantially rectangular cross section), there occurs some light leakage in the absence of an applied voltage; and since the height of the partition wall 17 is as small as about 1 μm for the display cell gap of about 6 μm, the axially symmetric orientation is not achieved even when a voltage is applied across the display cell. In Examples 5 and 6, a liquid crystal display device can be obtained where there is substantially no light leakage in the absence of an applied voltage (black display) while a stable axially symmetric orientation is achieved in the presence of an applied voltage (white display), despite that the height of the partition wall 17 is as small as about 1 μm. Thus, each of Examples 5 and 6 provides a wide-viewing-angle, high-contrast-ratio and high-brightness liquid crystal display device which has an aperture ratio which is not substantially reduced from that in which the partition wall 17 has a substantially rectangular cross section.

Figure 14:
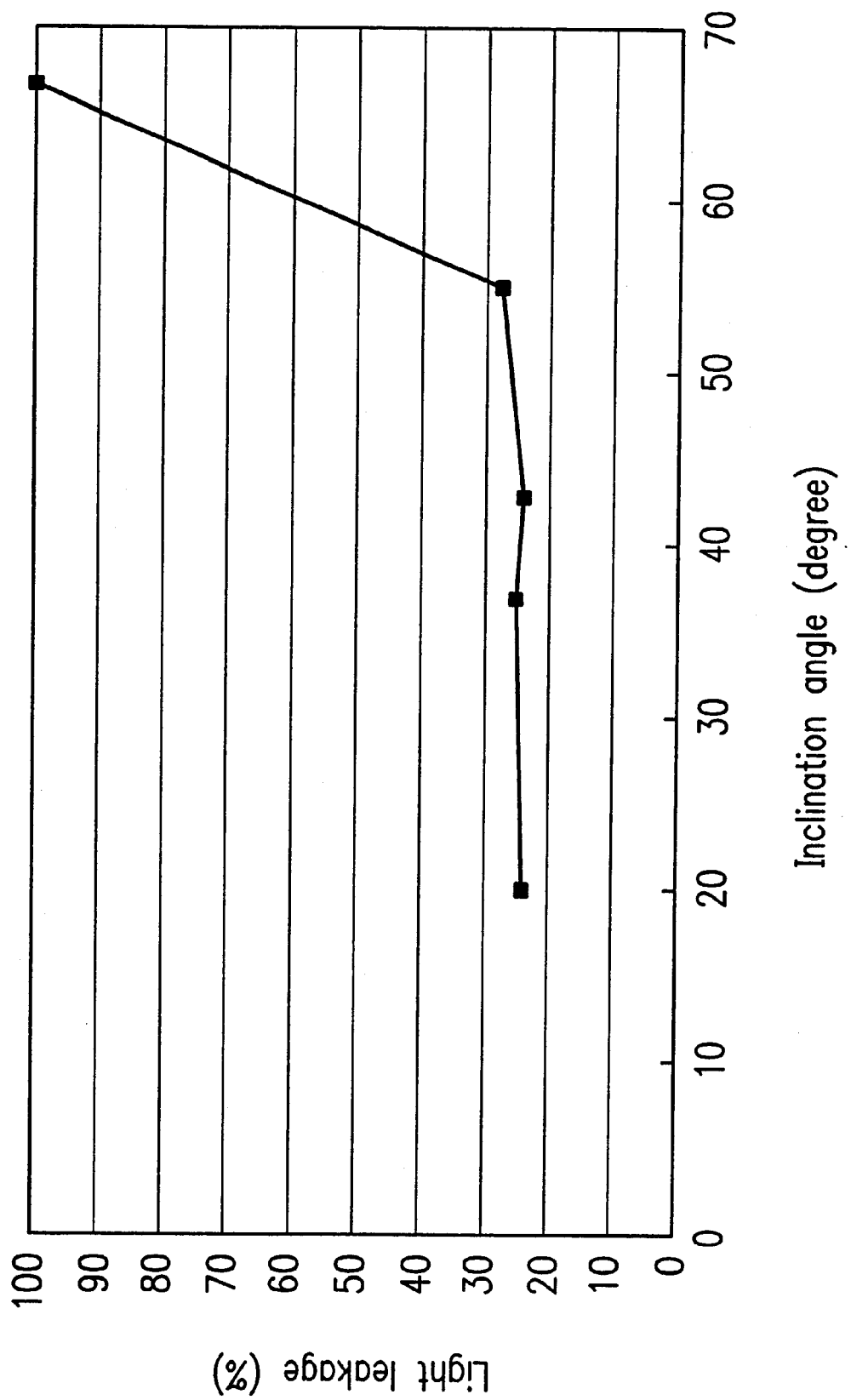
FIG. 14 is a graph illustrating the relationship between the inclination angle and the light leakage in a black display for a liquid crystal display device of the present invention.

FIG. 14 is a graph illustrating the inclination angle dependency of the amount of light leakage occurring in a black display. The horizontal axis represents the inclination angle of the partition wall, while the vertical axis represents the amount of light leakage in percent, with the amount of light leakage resulting in a black display with the inclination angle of about 67° being 100%. When the inclination angle is less than or equal to about 60°, the amount of light leakage is about 20% or less, whereby the contrast ratio will be satisfactory in practical use.

Control of Inclination Angle of Partition Wall By Adjusting Condition for Producing Partition Wall In Examples 7, 8, 9 and 10 below, the inclination angle of the partition wall is controlled by varying the conditions for producing the partition wall, such as exposure intensity, the exposure time, the prebake temperature, the mask gap, and the development time.

EXAMPLE 7

Exposure Intensity, Exposure Time

In Example 7, the inclination angle of the partition wall is controlled by varying the exposure intensity and the exposure time using the liquid crystal display device of Example 3.

The partition wall 17 is provided by a process substantially the same as that described above. An acrylic negative resist is applied on the glass substrate 8 to a height of about 1 μm using a spin coater, for example, followed by a prebake process at about 80° C. for about 120 seconds. The substrate is then irradiated for about 100 seconds with UV light at about 1 mW/cm$^2$ with a mask gap of about 100 μm. Thereafter, a development process is performed for about 7 minutes using CD (from FUJIFILM OLIN CO., LTD.) as a developing solution, after which the substrate is washed and dried, and postbaked at about 220° C. for about 1 hour.

As a result, the partition wall of Example 7 has an inclination angle of about 45°, while the partition wall of Example 3 has an inclination angle of about 40°.

EXAMPLE 8

Prebake Condition

In Example 8, the inclination angle of the partition wall is controlled by varying the temperature at the prebake process prior to the exposure and development processes using the liquid crystal display device of Example 3.

The partition wall 17 is provided by a process substantially the same as that described above. An acrylic negative resist is applied on the glass substrate 8 to a height of about 1 μm using a spin coater, for example, followed by a prebake process for about 120 seconds. The substrate is then irradiated for about 10 seconds with UV light at about 10 mW/cm$^2$ without a mask gap. Thereafter, a development process is performed for about 7 minutes using CD (from FUJIFILM OLIN CO., LTD.) as a developing solution, after which the substrate is washed and dried, and postbaked at about 220° C. for about 1 hour.

Figure 15:
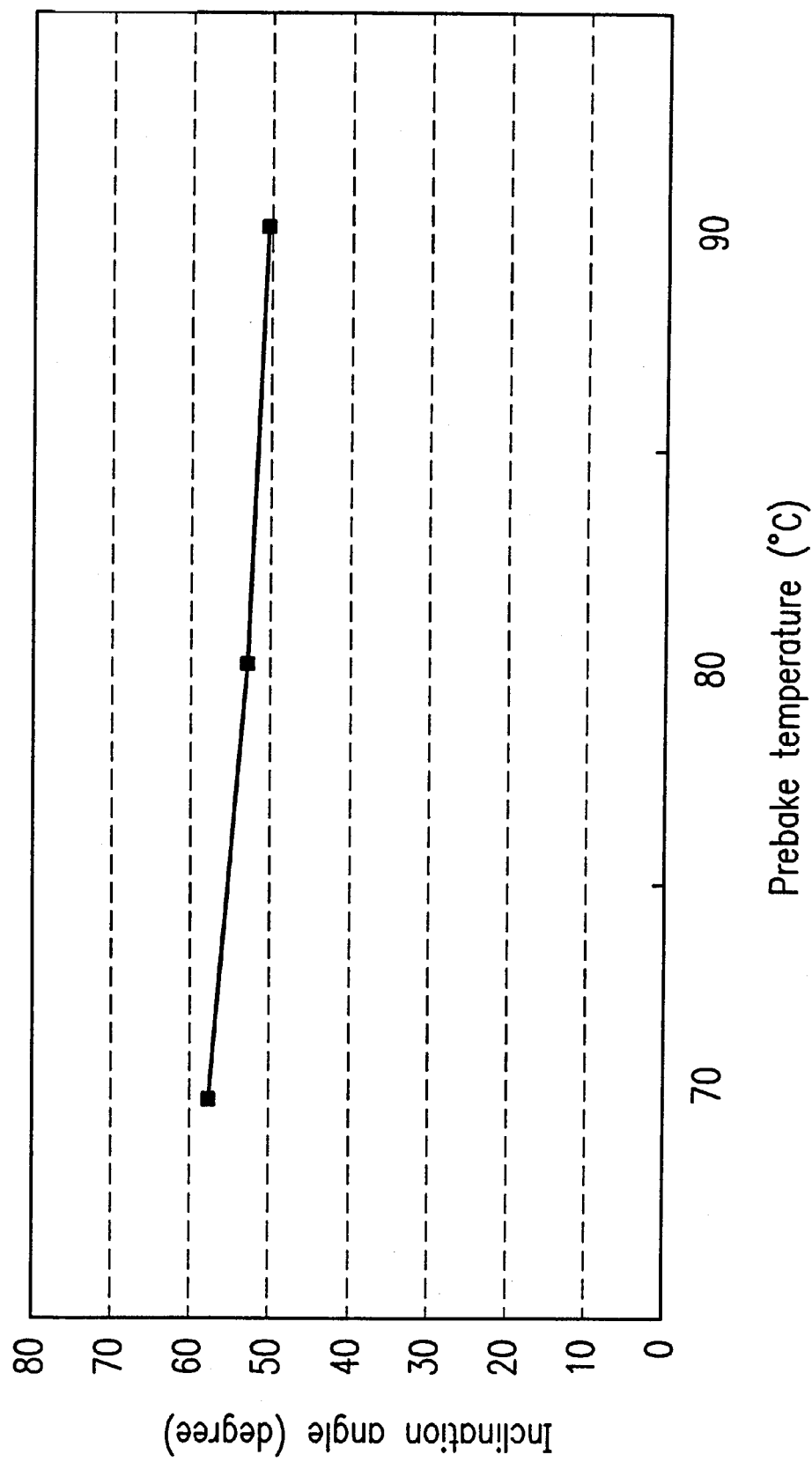
FIG. 15 is a graph illustrating the prebake temperature dependency of the inclination angle of a partition wall of a liquid crystal display device of the present invention.

FIG. 15 is a graph illustrating the inclination angle (indicated along the vertical axis in degrees (°)) for varied prebake temperatures of about 70° C., 80° C. and 90° C. (indicated along the horizontal axis).

EXAMPLE 9

Mask Gap

In Example 9, the inclination angle of the partition wall is controlled by varying the mask gap of a patterned mask used in the exposure process, using the liquid crystal display device of Example 3.

The partition wall 17 is provided by a process substantially the same as that described above. An acrylic negative resist is applied on the glass substrate 8 to a height of about 1 μm using a spin coater, for example, followed by a prebake process at about 80° C. for about 120 seconds. The substrate is then irradiated for about 10 seconds with UV light at about 10 mW/cm$^2$. Thereafter, a development process is performed for about 7 minutes using CD (from FUJIFILM OLIN CO., LTD.) as a developing solution, after which the substrate is washed and dried, and postbaked at about 220° C. for about 1 hour.

Figure 16:
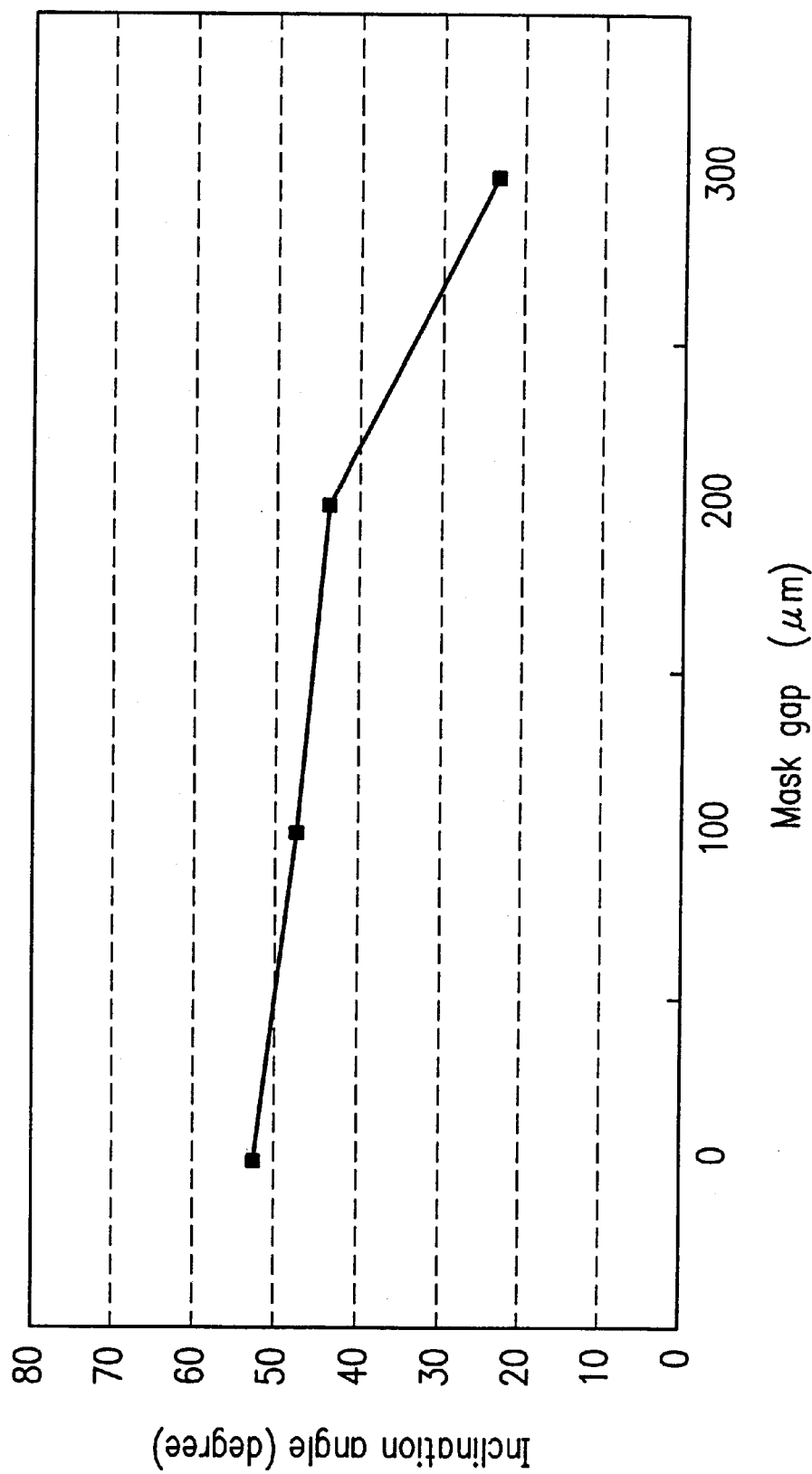
FIG. 16 is a graph illustrating the mask gap dependency of the inclination angle of a partition wall of a liquid crystal display device of the present invention.

FIG. 16 is a graph illustrating the inclination angle (indicated along the vertical axis in degrees (°)) for varied mask gaps of 0 μm, about 100 μm, about 200 μm and about 300 μm (indicated along the horizontal axis).

EXAMPLE 10

Development Time

In Example 10, the inclination angle of the partition wall is controlled by varying the development time using the liquid crystal display device of Example 3.

The partition wall 17 is provided by a process substantially the same as that described above. An acrylic negative resist is applied on the glass substrate 8 to a height of about 1 μm using a spin coater, for example, followed by a prebake process at about 80° C. for about 120 seconds. The substrate is then irradiated for about 10 seconds with UV light at about 10 mW/cm$^2$ without a mask gap. Thereafter, a development process is performed using CD (from FUJIFILM OLIN CO., LTD.) as a developing solution, after which the substrate is washed and dried, and postbaked at about 220° C. for about 1 hour.

Figure 17:
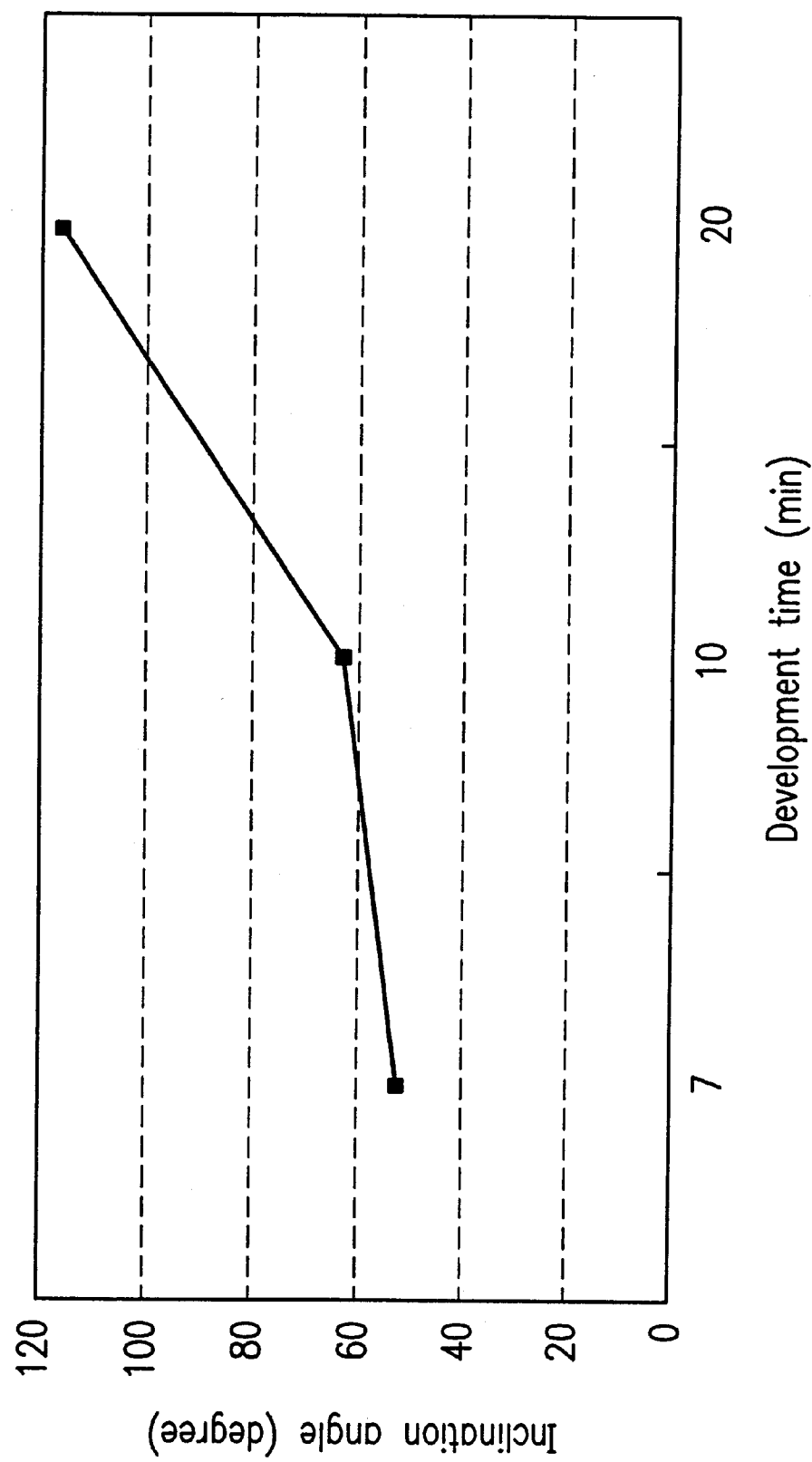
FIG. 17 is a graph illustrating the development time dependency of the inclination angle of a partition wall of a liquid crystal display device of the present invention.

FIG. 17 is a graph illustrating the inclination angle (indicated along the vertical axis in degrees (°)) for varied development times of 7 mins, 10 mins and 20 mins (indicated along the horizontal axis).

As described above in detail, according to the present invention, the partition walls are provided on a side of at least one of the substrates closer to the liquid crystal layer so as to define and separate the respective liquid crystal regions, thereby defining the position and the size of the respective liquid crystal regions in each of which the liquid crystal molecules are oriented in axial symmetry. In each liquid crystal region, the liquid crystal molecules are oriented in axial symmetry in the presence of an applied voltage, thereby reducing or eliminating the viewing angle dependency of the device. As described above, the partition wall of the present invention has an inclined section therein, whereby disturbance in the orientation of liquid crystal molecules along the periphery of the liquid crystal region in the vicinity of the partition wall is less likely to occur, thereby reducing or eliminating the amount of light leakage through the peripheral portion of the liquid crystal region, and thus increasing the contrast ratio in a black display and the display quality of the liquid crystal display device. Moreover, the height of the partition wall may be reduced so much that the injection rate of a liquid crystal material into the cell can be increased, thereby reducing the injection time and thus the production cost of the device. Moreover, in a large-screen liquid crystal display device, it is possible to substantially eliminate the distribution in the composition ratio of the liquid crystal material across the liquid crystal panel due to the chromatographic phenomenon, thereby obtaining a uniform display characteristic. Furthermore, because the height of the partition wall can be reduced, when the partition wall is made of a photosensitive resin, the increase in the width of the partition wall can substantially be reduced, whereby it is possible to improve the aperture ratio.

When the inclination angle of the partition wall is set to about 60° or less, it is possible to reduce the amount of light leakage through the peripheral portion of the liquid crystal region, thereby further improving the contrast ratio in a black display.

According to the method for producing a liquid crystal display device of the present invention, a photosensitive resin is provided on at least one of the substrates, which is then patterned by using a photolithography method. Thus, the partition wall having an inclined section therein can easily be produced by a simplified process.

The angle of the inclined section of the partition wall with respect to the surface of the first substrate may be easily controlled by adjusting at least one of, or a combination of two or more of, an exposure intensity, an exposure time, a prebake temperature, a mask gap and a development time. Thus, it is possible to realize a stable axially symmetric orientation in a white display with substantially no light leakage in a black display and with a high contrast ratio without decreasing the aperture ratio of the device.

Furthermore, the present invention provides a liquid crystal display device with a good viewing angle characteristic and a high contrast ratio where the liquid crystal molecules in each liquid crystal region are oriented in axial symmetry. The present invention may be used to provide a liquid crystal display device having a wide viewing angle characteristic suitable for use in a liquid crystal display apparatus having a flat display such as a personal digital assistance, a personal computer, a word processor, an amusement apparatus, an educational apparatus, a television set, or the like, which may be viewed by a large number of people at the same time, and in a display board, a window, a door, a wall, or the like, utilizing a shutter effect. The present invention may also be used in a large-screen liquid crystal display device suitable for use in a high definition TV, such as HDTV, a CAD monitor display, or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:

a first substrate and a second substrate;

a liquid crystal layer interposed between the first substrate and the second substrate; and a vertical alignment layer provided on at least one of the first substrate and the second substrate on a side which is closer to the liquid crystal layer, wherein:

the liquid crystal layer includes a plurality of liquid crystal regions partitioned by at least one partition wall provided on the first substrate on a side which is closer to the liquid crystal layer;

the liquid crystal layer has a liquid crystal material with a negative dielectric anisotropy;

liquid crystal molecules in the plurality of liquid crystal regions are oriented in a direction substantially perpendicular to the first substrate and the second substrate in an absence of an applied voltage;

the liquid crystal molecules in each of the liquid crystal regions are oriented in axial symmetry about an axis within the liquid crystal region which is substantially perpendicular to the first substrate and the second substrate in a presence of an applied voltage;

the at least one partition wall has a section which is inclined with respect to the surface of the first substrate, wherein the inclined section does not substantially project into a center area of any adjacent pixel region so that a cell gap of the liquid crystal layer in any adjacent pixel region is substantially uniform across said pixel region; and a spacer provided between said partition wall and said second substrate, said spacer for spacing the first and second substrates from one another.

2. A liquid crystal display device according to claim 1, further comprising a plasma substrate with at least one discharge channel provided on one of the first substrate and the second substrate on a side which is away from the liquid crystal layer, for applying a voltage across the liquid crystal layer via the one of the first substrate and the second substrate.

3. A liquid crystal display device according to claim 1, wherein the inclined section of the partition wall has an angle of about 3° to about 60° with respect to the surface of the first substrate.

4. A liquid crystal display device according to claim 1, wherein a height (h) of the partition wall and the cell gap (d) of the liquid crystal layer have a following relationship: h<d/4.

5. A liquid crystal display device according to claim 1, wherein the partition wall is made of a photosensitive resin.

6. The liquid crystal display of claim 1, wherein the inclined section is formed and shaped such that a liquid crystal region adjacent said inclined section includes a substantially flat or planar base portion that extends from a position adjacent said inclined section to at least a center of said liquid crystal region, and wherein said base portion has a width at least as great as a width of a bottom portion of said partition wall.

7. The liquid crystal display of claim 1, wherein each of a plurality of partition walls comprises at least one inclined section inclined with respect to the surface of the first substrate, and wherein each such inclined section does not substantially project into a center area of any adjacent pixel region so that the cell gap of the liquid crystal layer is substantially uniform across each of the plurality of liquid crystal regions.

8. The liquid crystal display device of claim 1, wherein said spacer is a pillar-like spacer.

9. The liquid crystal display device of claim 1, wherein said spacer includes an alignment layer thereon.

10. A method for producing a liquid crystal display device, the liquid crystal display device comprising:

a first substrate and a second substrate;

a liquid crystal layer interposed between the first substrate and the second substrate; and a vertical alignment layer provided on at least one of the first substrate and the second substrate on a side which is closer to the liquid crystal layer, wherein:

the liquid crystal layer includes a plurality of liquid crystal regions partitioned by at least one partition wall provided on the first substrate on a side which is closer to the liquid crystal layer;

the liquid crystal layer has a liquid crystal material with a negative dielectric anisotropy;

liquid crystal molecules in the plurality of liquid crystal regions are oriented in a direction substantially perpendicular to the first substrate and the second substrate in an absence of an applied voltage; and the liquid crystal molecules in each of the liquid crystal regions are oriented in axial symmetry about an axis within the liquid crystal region which is substantially perpendicular to the first substrate and the second substrate in a presence of an applied voltage, the method comprising the steps of:

providing a photosensitive resin on the first substrate;

patterning the photosensitive resin using a photolithography method so as to form the at least one partition wall having a section which is inclined with respect to the surface of the first substrate, and patterning the photosensitive resin so that the inclined section of the at least one partition wall does not substantially project into any center area of the plurality of pixel regions such that a cell gap of the liquid crystal layer is substantially uniform across each of the plurality of liquid crystal regions; and providing a spacer on a top portion of at least one of said partition walls so that said spacer is located between said at least one partition wall and said second substrate in order to space said first and second substrates from one another.

11. A method for producing a liquid crystal display device according to claim 10, further comprising the step of: providing a plasma substrate with at least one discharge channel on one of the first substrate and the second substrate on a side which is away from the liquid crystal layer, for applying a voltage across the liquid crystal layer via the one of the first substrate and the second substrate.

12. A method for producing a liquid crystal display device according to claim 10, wherein an angle of the inclined section of the partition wall with respect to the surface of the first substrate is controlled by at least one condition in the photolithography method.

13. A method for producing a liquid crystal display device according to claim 12, wherein the condition is one of an exposure intensity, an exposure time, a prebake temperature, a mask gap and a development time.

14. A method for producing a liquid crystal display device according to claim 12, wherein the condition includes, in combination, two or more of an exposure intensity, an exposure time, a prebake temperature, a mask gap and a development time.

15. A method for producing a liquid crystal display device according to claim 10, wherein the inclined section of the partition wall has an angle of about 3° to about 60° with respect to the surface of the first substrate.

16. A method for producing a liquid crystal display device according to claim 10, wherein a height (h) of the partition wall and the cell gap (d) of the liquid crystal layer have a following relationship: h<d/4.

17. The method of claim 10, wherein said spacer is a pillar-like spacer.

18. A liquid crystal display device, comprising:

a first substrate and a second substrate;

a liquid crystal layer interposed between the first substrate and the second substrate; and a vertical alignment layer provided on at least one of the first substrate and the second substrate on a side which is closer to the liquid crystal layer, wherein:

the liquid crystal layer includes a plurality of liquid crystal regions partitioned by at least one partition wall provided on the first substrate on a side which is closer to the liquid crystal layer;

liquid crystal molecules in the plurality of liquid crystal regions are oriented in a direction substantially perpendicular to the first substrate and the second substrate in an absence of an applied voltage;

the liquid crystal molecules in each of the liquid crystal regions are oriented in axial symmetry about an axis within the liquid crystal region which is substantially perpendicular to the first substrate and the second substrate in a presence of an applied voltage;

the partition wall has a section which is inclined with respect to the surface of the first substrate in a manner such that a liquid crystal region adjacent said inclined section includes a substantially flat or planar base portion that extends from a position adjacent said inclined section to at least a center of said liquid crystal region, and wherein said base portion has a width at least as great as a width of a bottom portion of said partition wall; and a spacer for spacing a top portion of said partition wall from said second substrate.

19. The liquid crystal display device of claim 18, wherein said spacer comprises a pillar-like spacer.

* * * * *